United States Patent
Nishii

(10) Patent No.: US 10,365,004 B2
(45) Date of Patent: Jul. 30, 2019

(54) CONTROL METHOD AND COMMUNICATION DEVICE

(71) Applicant: Panasonic Intellectual Property Corporation of America, Torrance, CA (US)

(72) Inventor: Yoshimi Nishii, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 515 days.

(21) Appl. No.: 14/701,539

(22) Filed: May 1, 2015

(65) Prior Publication Data
US 2015/0330649 A1    Nov. 19, 2015

(30) Foreign Application Priority Data
May 13, 2014    (JP) .................................. 2014-099665

(51) Int. Cl.
| | |
|---|---|
| F24F 11/00 | (2018.01) |
| F24F 11/79 | (2018.01) |
| G05B 15/02 | (2006.01) |
| F24F 11/30 | (2018.01) |
| F24F 11/62 | (2018.01) |
| F24F 11/77 | (2018.01) |

(Continued)

(52) U.S. Cl.
CPC .............. *F24F 11/79* (2018.01); *F24F 11/30* (2018.01); *F24F 11/62* (2018.01); *F24F 11/77* (2018.01); *G05B 15/02* (2013.01); *F24F 11/52* (2018.01); *F24F 11/54* (2018.01); *F24F 11/64* (2018.01); *F24F 2120/10* (2018.01); *F24F 2120/12* (2018.01); *F24F 2120/20* (2018.01)

(58) Field of Classification Search
CPC .................... G01C 21/3644; F24F 2011/0035
USPC .......................... 701/426; 340/994; 700/276
See application file for complete search history.

(56) References Cited

U.S. PATENT DOCUMENTS

| | | | |
|---|---|---|---|
| 8,374,725 B1 * | 2/2013 | Ols ...................... | F24F 11/0012 261/118 |
| 2004/0183826 A1 * | 9/2004 | Taylor ..................... | F24F 13/20 454/301 |

(Continued)

FOREIGN PATENT DOCUMENTS

| | | | | |
|---|---|---|---|---|
| CN | 103032935 A | * | 8/2012 | ............. F24F 11/00 |
| CN | 103032935 A | * | 4/2013 | |
| JP | 2012-141104 | | 7/2012 | |

OTHER PUBLICATIONS

WSDOT, WSDOT CAE Support, Apr. 2014, p. 1-3, http://www.wsdot.wa.gov/publications/fulltext/design/cae/TechNotes/MS_AccuSnap.pdf.*

*Primary Examiner* — Emilio J Saavedra
(74) *Attorney, Agent, or Firm* — Greenblum & Bernstein, P.L.C.

(57) ABSTRACT

A first detection unit detects a horizontal air-blowing position inputted by a user using a plan view of a room included in an operation screen. A second detection unit detects a vertical air-blowing position inputted by the user using a profile view included in the operation screen. A generation unit determines an airflow direction of an air conditioner from the horizontal air-blowing position detected by the first detection unit and the vertical air-blowing position detected by the second detection unit, and generates control data that specifies the determined airflow direction.

16 Claims, 18 Drawing Sheets

(51) Int. Cl.
*F24F 120/10* (2018.01)
*F24F 120/12* (2018.01)
*F24F 120/20* (2018.01)
*F24F 11/64* (2018.01)
*F24F 11/54* (2018.01)
*F24F 11/52* (2018.01)

(56) References Cited

U.S. PATENT DOCUMENTS

| | | | |
|---|---|---|---|
| 2005/0114779 A1* | 5/2005 | Griesmer | F24F 11/0012 261/118 |
| 2009/0216383 A1* | 8/2009 | Klinger | B60H 1/00985 700/278 |
| 2013/0138249 A1* | 5/2013 | Cho | G05B 19/02 700/276 |
| 2014/0005838 A1* | 1/2014 | Ogura | F24F 11/0086 700/276 |
| 2014/0081467 A1* | 3/2014 | Sato | F24F 11/0009 700/276 |
| 2014/0369805 A1* | 12/2014 | Park | F24F 11/0034 415/1 |
| 2015/0338123 A1* | 11/2015 | Iwano | F24F 13/20 454/301 |
| 2016/0147919 A1* | 5/2016 | Yabe | H04L 12/2816 700/275 |

* cited by examiner

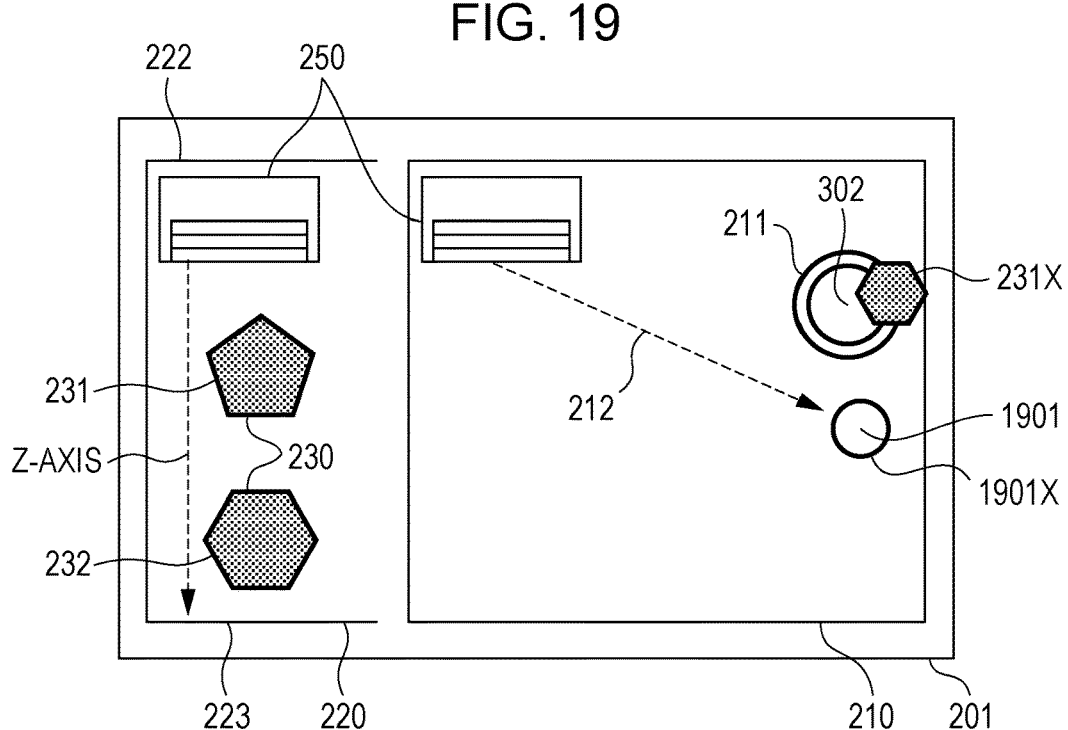
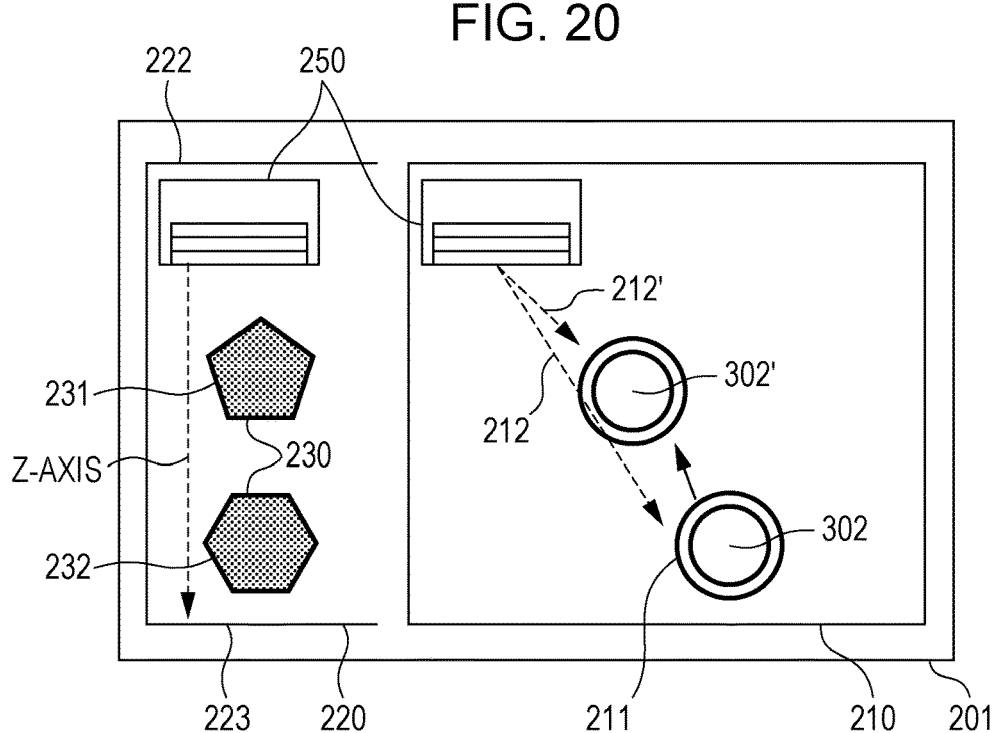

CONTROL METHOD AND COMMUNICATION DEVICE

BACKGROUND

1. Technical Field

The present disclosure relates to techniques for controlling an air-blowing apparatus by using a communication device provided with a display.

2. Description of the Related Art

Japanese Unexamined Patent Application Publication No. 2012-141104 discloses a technique for controlling the flow of the air. According to this technique, a transmission position of a remote control is detected from an infrared signal transmitted by the remote control; a temperature distribution within a space that is to be air-conditioned is obtained; and the position of the transmitter is identified from the detected transmission position and the obtained temperature distribution. Then, a range limit is obtained from the identified position of the transmitter and an area that is to be air-conditioned; the position of a person present within the range limit is obtained, as range-limit positional information, on the basis of a latest temperature distribution; and the flow of the air is controlled on the basis of the range-limit positional information.

According to the technique disclosed in Japanese Unexamined Patent Application Publication No. 2012-141104, the flow of the air is controlled in the following manner. When a heat-sensitive-operation key is pressed, a strong, cooled air blows toward a person within the range limit; and when a cold-sensitive-operation key is pressed, a cooled air blows so as not to hit a person within the range limit.

Such a conventional technique, however, needs an improvement.

SUMMARY

One non-limiting and exemplary embodiment provides a technique that enables an airflow direction of an air-blowing apparatus to be configured through a simple operation.

In one general aspect, the techniques disclosed here feature a control method through which a communication device provided with a display controls an air-blowing apparatus. The communication device includes a memory that stores installation position information indicating a horizontal position of the air-blowing apparatus in a room in which the air-blowing apparatus is installed and a vertical position of the air-blowing apparatus from a floor of the room. The control method includes the step of detecting a horizontal air-blowing position and a vertical air-blowing position. The horizontal air-blowing position is inputted by a user using a plan view of the room displayed on the display, and the vertical air-blowing position is inputted by the user using a profile view of the room displayed on the display. The control method further includes the steps of determining an airflow direction of the air-blowing apparatus from the horizontal air-blowing position and the vertical air-blowing position detected in the step of detecting and the installation position information, and generating control data that specifies the airflow direction determined in the step of determining. The control method further includes the step of transmitting the control data generated in the step of generating to the air-blowing apparatus.

According to the above aspect, an improvement can be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 19 illustrates are operation screen according to a first modification of the present disclosure;

FIG. 20 illustrates an operation screen according to a second modification of the present disclosure;

DETAILED DESCRIPTION

Figure 1:
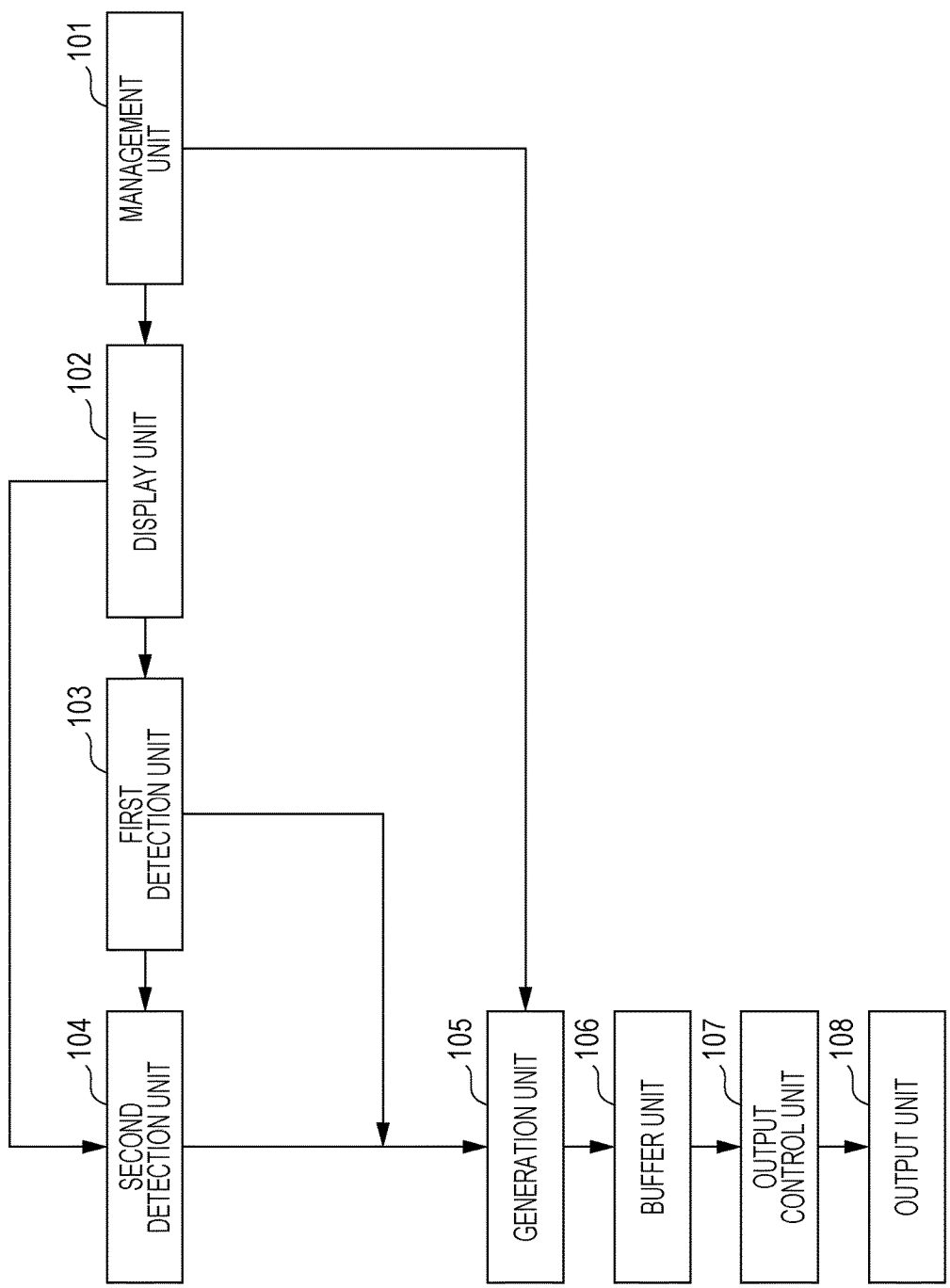
FIG. 1 is a block diagram illustrating an exemplary configuration of a communication device according to a first embodiment of the present disclosure.

Underlying Knowledge Forming Basis of the Present Disclosure

Japanese Unexamined Patent Application Publication No. 2012-141104, mentioned above, discloses an air conditioner that controls the flow of the air in such a manner that a cooled air blows toward a person within a range limit if that person is sensitive to heat and a cooled air blows so as not to hit a person within the range limit if that person is sensitive to cold.

However, according to Japanese Unexamined Patent Application Publication No. 2012-141104, a user needs to specify an air-blowing position by moving a remote control, and such a technique disadvantageously requires an additional action by the user. In addition, when the positions of multiple people are to be detected, each person needs to have a remote control, and disadvantageously, the specification of the air-blowing positions depends on the number of remote controls.

The present disclosure provides a technique that enables an airflow direction of an air-blowing apparatus to be configured through a simple operation.

(1) A control method according to an aspect of the present disclosure for solving the above-described problem is a control method through which a communication device provided with a display controls an air-blowing apparatus. The communication device includes a memory that stores installation position information indicating a horizontal position of the air-blowing apparatus in a room which the air-blowing apparatus is installed and a vertical position of the air-blowing apparatus from a floor of the room. The control method includes the step of detecting a horizontal air-blowing position and a vertical air-blowing position, The horizontal air-blowing position is inputted by a user using a plan view of the room displayed on the display, and the vertical air-blowing position is inputted by the user using a profile view of the room displayed on the display. The control method further includes the steps of determining an airflow direction of the air-blowing apparatus from the horizontal air-blowing position and the vertical air-blowing position detected in the step of detecting and the installation position information, and generating control data that specifies the airflow direction determined in the step of determining. The control method further includes the step of transmitting the control data generated in the step of generating to the air-blowing apparatus.

In this case, the user can input the airflow direction of the air-blowing apparatus through a simple operation, namely, by inputting the vertical air-blowing position in the profile view and inputting the horizontal air-blowing position in the plan view.

(2) In the control method according to the above-described aspect, one or more users may input respective horizontal air-blowing positions and respective vertical air-blowing positions, and the control method may further include the step of storing the horizontal air-blowing positions and the vertical air-blowing positions inputted by the one or more users in the memory in such a manner that the horizontal air-blowing positions are associated with the corresponding vertical air-blowing positions for the respective users. In the step of generating, the control data may be generated from the horizontal air-blowing positions and the vertical air-blowing positions for the respective users stored in the memory.

In this case, the horizontal air-blowing positions are associated with the corresponding vertical air-blowing positions for the respective users, and the associated data is stored in the memory. The control data is then generated from the horizontal air-blowing positions and the vertical air-blowing positions for the respective users. Thus, air-blowing instructions can be accepted from multiple users.

(3) In the control method according to the above-described aspect, in the step of detecting, an in-plane instruction icon that indicates the horizontal air-blowing position detected in the step of detecting may be displayed on the plan view. In addition, in the step of generating, in a case in which a height-instruction icon with which the vertical air-blowing position detected in the step of detecting is associated is moved to fall within a predetermined effective range relative to the horizontal air-blowing position, it may be determined that an input of the user is valid.

In this case, as the height-instruction icon with which the vertical air-blowing position is associated is moved onto the in-plane instruction icon displayed on the plan view, the horizontal air-blowing position and the vertical air-blowing position are associated with each other. Therefore, the user can input the horizontal air-blowing position and the vertical air-blowing position through a simple operation of moving the height-instruction icon.

(4) In the control method according to the above-described aspect, the step of generating may include the steps of setting an air-blowing effective range corresponding to the vertical air-blowing position detected in the step of detecting on the plan view, and displaying on the display an invalid mark indicating that an input is invalid in a case in which the horizontal air-blowing position detected in the step of detecting is not located within the air-blowing effective range.

In this case, when the horizontal air-blowing position inputted by the user is outside the effective range corresponding to the vertical air-blowing position inputted by the user, the user is notified that the input is invalid. Therefore, even in a case in which the actual air-blowing position of the air-blowing apparatus differs from the air-blowing position inputted by the user, the user can have a sense of acceptance.

(5) The control method according to the above-described aspect may further include the steps of determining whether the air-blowing apparatus can blow the air to the horizontal air blowing position and the vertical air-blowing position inputted by the user, and displaying an actual horizontal air-blowing position of the air-blowing apparatus on the plan view in a case in which it is determined that the air-blowing apparatus cannot blow the air to the horizontal air-blowing position and the vertical air-blowing position inputted by the user.

In this case, the user can recognize the reason why the air is not blown to the air-blowing position inputted by the user, and can also recognize the actual air-blowing position of the air-blowing apparatus.

(6) The control method according to the above-described aspect may further include the step of detecting a movement of the user. In the step of generating, in a case in which the movement of the user is detected after the air-blowing apparatus has been controlled in accordance with the control data, control data for changing the airflow direction determined in the step of determining to a position to which the user has moved may be generated.

In this case, when the movement of the user is detected, the airflow direction of the air-blowing apparatus is changed so as to follow the movement. Therefore, the user can continue to receive a desirable air from the air-blowing apparatus.

(7) In the control method according to the above-described aspect, a plurality of air-blowing apparatuses are provided, and in the step of detecting, a selection of one of the air-blowing apparatuses by the user may be detected. In the step of generating, the control data may be transmitted to the one of the air-blowing apparatuses that is selected by the user.

In this case, even in a case in which multiple air-blowing apparatuses are installed in a room, the user can select an air-blowing apparatus that the user wants to blow the air.

(8) In the control method according to the above-described aspect, a plurality of height-instruction icons that are associated with mutually different vertical air-blowing positions may be displayed on the profile view, and in the step of detecting, the vertical air-blowing position may be detected by detecting a selection of one of the height-instruction icons by the user.

In this case, when a height-instruction icon among the multiple height-instruction icons is selected, the vertical air-blowing position defined by the selected height-instruction icon is inputted. Therefore, the user can input the vertical air-blowing position through a simple operation of selecting a height-instruction icon.

(9) In the control method according to the above-described aspect, in the step of detecting, the user may specify a position on the profile view, and a vertical air-blowing position corresponding to the position specified by the user may be detected as a vertical air-blowing position inputted by the user.

In this case, the user can input a vertical air-blowing position at a desired position.

Overall Configuration

Figure 23:
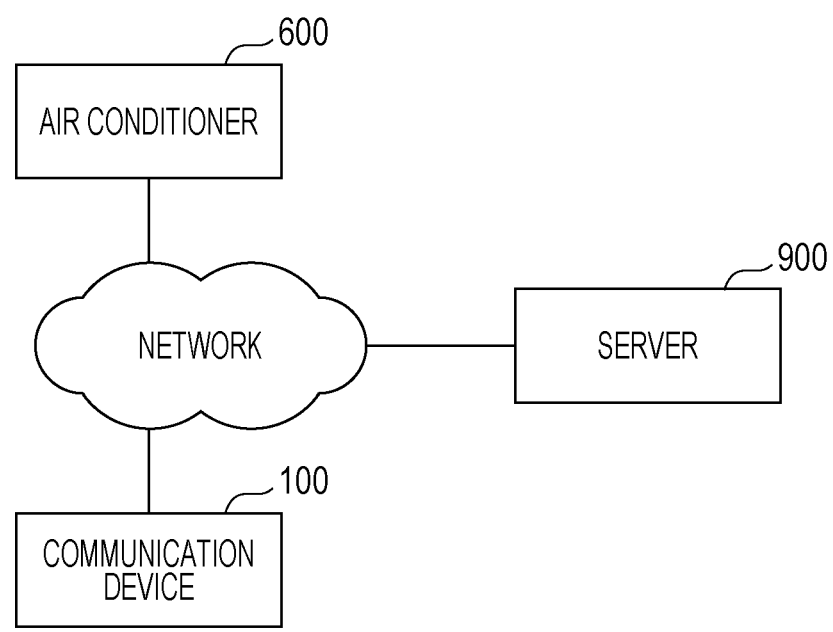
FIG. 23 illustrates an exemplary overall configuration of an air-conditioning system according to the present disclosure.

FIG. 23 illustrates an exemplary overall configuration of an air-conditioning system according to the present disclosure. The air-conditioning system includes a communication device 100, an air conditioner 600 (an example of an air-blowing apparatus), and a server 900. The communication device 100 may be, for example, a computer that a user can carry around, such as a mobile phone, a smartphone, and a tablet terminal. Alternatively, the communication device 100 may be a dedicated remote control for the air conditioner 600.

The air conditioner 600 is installed in the user's house, and operates in accordance with a user instruction inputted through the communication device 100. The server 900, for example, is a cloud server constituted by one or more computers. In the present disclosure, the server 900 may be, for example, a manufacturer's server through which the manufacturer of the air conditioner 600 provides users with various types of services related to the air conditioner 600.

A network includes, for example, an outdoor network and an indoor network. The air conditioner 600 and the communication device 100 are interconnected through the indoor network; the air conditioner 600 and the server 900 are interconnected through the outdoor network; and the communication device 100 and the server 900 are interconnected through the outdoor network. The indoor network is installed inside the house in which the air conditioner 600 is installed, and includes a wireless local area network (LAN), a wired LAN, or a combination thereof. The outdoor network, for example, is the Internet. The communication device 100, the air conditioner 600, and the server 900 communicate there among via a communication protocol, such as a transmission control protocol/internet protocol (TCP/IP).

First Embodiment

FIG. 1 is a block diagram illustrating an exemplary configuration of a communication device 100 according to a first embodiment of the present disclosure. The communication device 100 includes a management unit 101, a display unit 102, a first detection unit 103, a second detection unit 104, a generation unit 105, a buffer unit 106, an output control unit 107, and an output unit 108.

Figure 3:
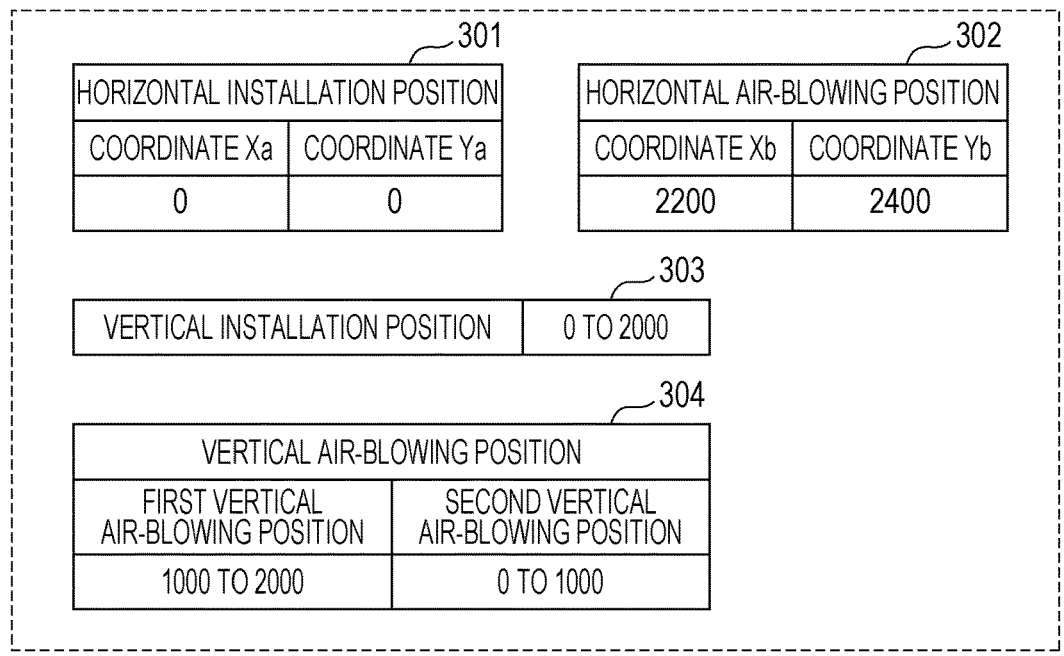
FIG. 3 illustrates exemplary data structures of various pieces of data to be used in the first embodiment.

The management unit 101, for example, is constituted by a non-volatile rewritable memory and a processor that controls the memory. The management unit 101 stores installation position information in the memory and manages the installation position information. The installation position information indicates an installation position of the air conditioner 600 within a room in which the air conditioner 600 is installed. In the present disclosure, as illustrated in FIG. 3, the installation position information includes a horizontal installation position 301 and a vertical installation position 303.

Figure 2:
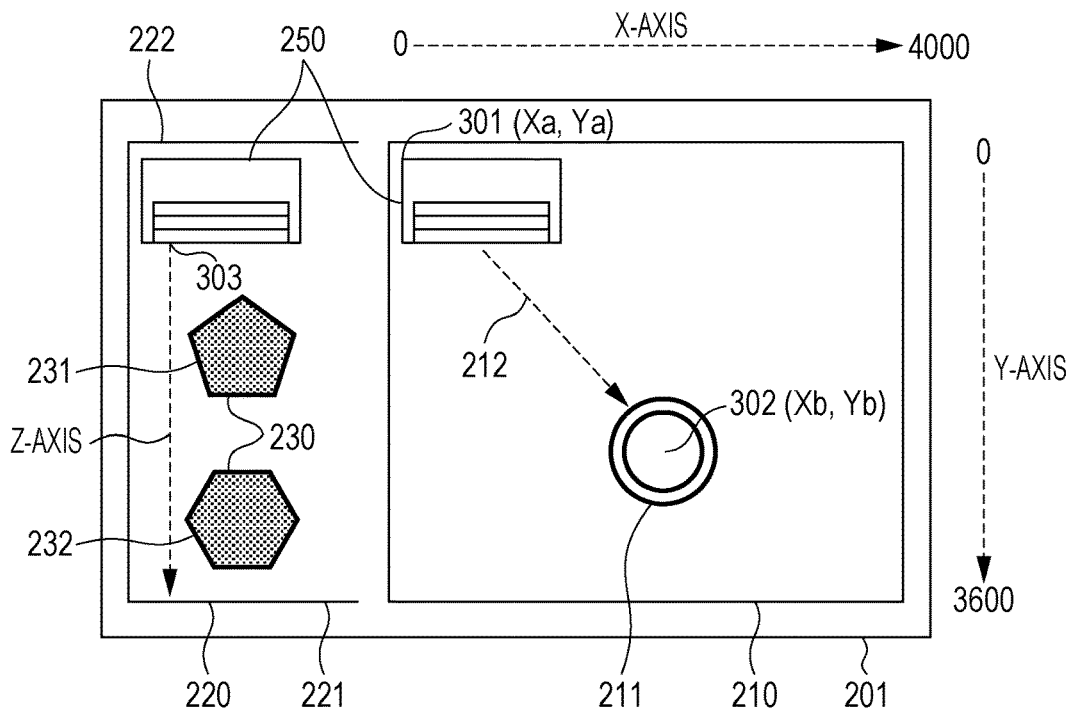
FIG. 2 Illustrates an exemplary operation screen according to the first embodiment.

The horizontal installation position 301 indicates plane coordinates of the air conditioner 600 on a floor plan (plan view 210) that overlooks the room in which the air conditioner 600 is installed, as illustrated in FIG. 2. The horizontal installation position 301 includes a coordinate Xa that indicates a position of the installed air conditioner 600 along the X-axis and a coordinate Ya that indicates the stated position along the Y-axis on the plan view 210.

The vertical installation position 303 indicates the height of the position of the air conditioner 600 from the floor, which serves as a reference, in the room in which the air conditioner 600 is installed, as indicated in a profile view 220 illustrated in FIG. 2. In this manner, the horizontal installation position 301 and the vertical installation position 303 define the three-dimensional position of the air conditioner 600 in the room.

The management unit 101 manages information on the X-axis and the Y-axis defined in the plan view 210 and information on the Z-axis defined in the profile view 220.

The management unit 101 also manages a vertical air-blowing position 304 illustrated in FIG. 3. The vertical air-blowing position 304 includes a first vertical air-blowing position and a second vertical air-blowing position. The first vertical air-blowing position indicates a coordinate along the Z-axis that is associated in advance with a first height-instruction Icon 231 provided in the profile view 220 illustrated in FIG. 2. Meanwhile, the second vertical air-blowing position indicates a coordinate along the Z-axis that is associated in advance with a second height-instruction icon 232 provided in the profile view 220. The first vertical air-blowing position is higher than the second vertical air-blowing position, The display unit 102 is constituted by a display and a processor that controls the display, and displays various types of screens. In the present disclosure, as illustrated in FIG. 2, the display unit 102 displays an operation screen 201 that allows the user to operate the air conditioner 600 by using the communication device 100. The display that constitutes the display unit 102 may be, for example, a touch-panel liquid-crystal display. The processor in the display unit 102, for example, generates image data of the operation screen 201 and detects user operations, such as tapping, swiping, and clicking.

The first detection unit 103, for example, is constituted by a processor and detects a horizontal air-blowing position 302

(FIG. 3) inputted by the user using the plan view 210 of the room included in the operation screen 201. The horizontal air-blowing position 302 defines a horizontal airflow-direction component (an X-Y component of the airflow direction). The horizontal air-blowing position 302 is thus expressed by two-dimensional data containing a coordinate Xb and a coordinate Yb.

The second detection unit 104, for example, is constituted by a processor and detects a vertical air-blowing position 304 inputted by the user using the profile view 220 included in the operation screen 201. In the first embodiment, the user inputs the vertical air-blowing position 304 by selecting either the first height-instruction icon 231 or the second height-instruction icon 232. Thus, when the second detection unit 104 detects a tap on the first height-instruction icon 231, the second detection unit 104 determines that the vertical air-blowing position 304 associated with the first height-instruction icon 231 is the vertical air-blowing position 304 inputted by the user. Meanwhile, when the second detection unit 104 detects a tap on the second height-instruction icon 232, the second detection unit 104 determines that the vertical air-blowing position 304 associated with the second height-instruction icon 232 is the vertical air-blowing position 304 inputted by the user.

The generation unit 105, for example, is constituted by a processor. The generation unit 105 determines the airflow direction of the air conditioner 600 from the horizontal air-blowing position 302 detected by the first detection unit 103 and the vertical air-blowing position 304 detected by the second detection unit 104, and generates control data that specifies the determined airflow direction.

The buffer unit 106 is constituted by a volatile storage device and temporarily stores the control data generated by the generation unit 105.

The output control unit 107 appends header information and so on to the control data stored in the buffer unit 106 so as to enable the control data to be transmitted to the air conditioner 600.

The output unit 108, for example, is constituted by communication circuitry that connects the communication device 100 to the indoor network and the outdoor network, and outputs, to the networks, the control data to which the header information has been appended by the output control unit 107. In the present disclosure, the control data may be transmitted directly from the communication device 100 to the air conditioner 600, or may be transmitted from the communication device 100 to the air conditioner 600 via the server 900. In the former case, the output unit 108 transmits the control data to the air conditioner 600; whereas, in the latter case, the output unit 108 transmits the control data to the server 900.

FIG. 2 illustrates an example of the operation screen 201 according to the first embodiment. The operation screen 201 includes the plan view 210 and the profile view 220. The plan view 210 is a floor plan that overlooks the room in which the air conditioner 600 is installed. The plan view 210 includes an air-conditioner icon 250. The air-conditioner icon 250 is displayed at the horizontal installation position 301 that indicates the position of the air conditioner 600 on the plan view 210. In the example illustrated in FIG. 2, the horizontal installation position 301 is set to the upper-left vertex of the air-conditioner icon 250, but this is not a limiting example. For example, the horizontal installation position 301 may be set to a position on the plan view 210 that corresponds to a centroid position of the air conditioner 600, or may be set to a position on the plan view 210 that corresponds to the center position of the air-blowing opening of the air conditioner 600. For simplicity, in the example Illustrated in FIG. 2, the air-conditioner icon 250 displayed on the plan view 210 shows a front-view image of the air conditioner 600. However, when overlooking the room, one sees the top view, instead of the front view, of the actual air conditioner 600.

In the plan view 210, the X-axis extends in the lateral direction, and the Y-axis extends in the longitudinal direction. The X-axis in a real space corresponds to one direction in the room as it is overlooked, and the Y-axis in the real space corresponds to another direction that is orthogonal to the one direction. The X-axis and the Y-axis, for example, are each given a scale that extends over several meters. In the example illustrated in FIG. 2, the X-axis is given in a coordinate in a range from 0 to 4000 (mm), and the Y-axis is given in a coordinate in a range from 0 to 3600 (mm).

The plan view 210 includes an in-plane instruction icon 211 that allows the user to determine the horizontal air-blowing position 302. In the present disclosure, for example, the user inputs the horizontal air-blowing position 302 by tapping the plan view 210 on a desired position. Thus, the in-plane instruction icon 211 is displayed at a position on which the user has tapped the plan view 210, When changing the horizontal air-blowing position 302, the user, for example, may swipe on the plan view 210 to move the displayed in-plane instruction on 211 to a desired position. Alternatively, the in-plane instruction icon 211 may be displayed in advance in the plan view 210, and the user may swipe to move the in-plane instruction icon 211 so as to input the horizontal air-blowing position 302.

A horizontal airflow-direction component 212 is a projection of the airflow direction of the air conditioner 600 on a horizontal plane (floor surface). The horizontal airflow-direction component 212 is expressed by a two-dimensional vector that connects the horizontal installation position 301 and the horizontal air-blowing position 302.

The profile view 220 is displayed, for example, to the left of the plan view 210. The profile view 220 represents the room as viewed in the direction orthogonal to the normal of the floor surface. The profile view 220 also displays the air-conditioner icon 250. The profile view 220 displays the air-conditioner icon 250 immediately underneath a ceiling position 222.

In the profile view 220, a floor position 221, the ceiling position 222, and the Z-axis are defined. The floor position 221 corresponds to the actual position of the floor in the room and the value of the floor position 221 on the Z-coordinate is 0. The ceiling position 222 corresponds to the actual position of the ceiling in the room. The Z-axis indicates the actual height from the floor in the room. In the profile view 220, the vertical installation position 303 is defined at an intersection of the lower side of the air-conditioner icon 250 and the Z-axis.

The profile view 220 displays height-instruction icons 230. The height-instruction icons 230 are used by the user to input the vertical air-blowing position 304. The vertical air-blowing position 304 indicates the height of a given position from the floor in the room in which the user is present. The profile view 220 displays, as the height-instruction icons 230, the first height-instruction icon 231 and the second height-instruction icon 232 that are aligned along the Z-axis. The first height-instruction icon 231 and the second height-instruction icon 232 are associated with different vertical blowing positions 304. Therefore, the profile view 220 displays the first height-instruction icon 231 and the second height-instruction icon 232 at respective vertical positions with which the first height-instruction icon 231 and the second height-instruction icon 232 are associated in advance.

In the example illustrated in FIG. 2, the vertical air-blowing position 304 associated with the first height-instruction icon 231 is higher than the vertical air-blowing position 304 associated with the second height-instruction icon 232. Thus, the profile view 220 displays the first height-instruction icon 231 above the second height-instruction icon 232.

The first height-instruction icon 231 is to be selected by a user who does not want to be hit directly by the air from the air conditioner 600, and the second height-instruction icon 232 is to be selected by a user who wants to be hit directly by the air from the air conditioner 600. A user can determine the airflow direction by using the operation screen 201 illustrated in FIG. 2, for example, through the following operations.

First Exemplary Operation

In a first exemplary operation, the user taps the profile view 220 on either the first height-instruction icon 231 or the second height-instruction icon 232 so as to select either one of the icons. If the user does not want to be hit directly by the air, the user taps the first height-instruction icon 231. Meanwhile, if the user wants to be hit directly by the air, the user taps the second height-instruction icon 232.

The user then taps the plan view 210 on a desired position to specify the horizontal air-blowing position 302. Through this operation, the in-plane instruction icon 211 is displayed, and the horizontal airflow-direction component 212 is determined. Then, the airflow direction is determined from the inputted horizontal air-blowing position 302 and vertical air-blowing position 304.

Second Exemplary Operation

In a second exemplary operation, the user taps the plan view 210 on a desired position to input the horizontal air-blowing position 302. The user then selects either the first height-instruction icon 231 or the second height-instruction icon 232 so as to input the vertical air-blowing position 304. Then, the airflow direction is determined from the inputted horizontal air-blowing position 302 and vertical air-blowing position 304.

FIG. 3 illustrates exemplary data structures of various pieces of data to be used in the first embodiment. The horizontal installation position 301 indicates the plane coordinates of the air conditioner 600 on the plan view 210. In the example illustrated in FIG. 3, the coordinate Xa and the coordinate Ya for the horizontal installation position 301 are both 0, Values inputted in advance by an operator or a user when the air-conditioning system is introduced are used to define the horizontal installation position 301. The horizontal installation position 301 can be changed to any desired values. Thus, when the installation position of the air conditioner is changed, the operator or the user may input the values that define the changed horizontal installation position 301.

The horizontal air-blowing position 302 defines the horizontal airflow-direction component 212 specified by the user using the plan view 210. In the example illustrated in FIG. 3, the coordinate Xb and the coordinate Yb for the horizontal air-blowing position 302 are 2200 and 2400, respectively.

The vertical installation position 303 indicates the height of the position of the air conditioner 600 from the floor serving as the reference. In the example illustrated in FIG. 3, the vertical installation position 303 is defined as 0-2000. This setting indicates that the vertical installation position 303 is set to 2000 with the floor position 221 serving as the reference. The vertical installation position 303 can be changed as desired so as to accord with a change in the installation position of the air conditioner 600.

The vertical air-blowing position 304 includes the first vertical air-blowing position and the second vertical air-blowing position. The first vertical air-blowing position corresponds to the vertical air-blowing position 304 associated with the first height-instruction icon 231. Meanwhile, the second vertical air-blowing position corresponds to the vertical air-blowing position 304 associated with the second height-instruction 232. In the example illustrated in FIG. 3, the first vertical air-blowing position is defined as 1000-2000. This setting indicates that louvers of the air conditioner 600 are caused to swing such that the height component of the airflow direction falls within a range from 1000 (mm) to 2000 (mm) at the horizontal air-blowing position 302. In addition, the second vertical air-blowing position is defined as 0-1000. This setting indicates that the louvers of the air conditioner 600 are caused to swing such that the height component of the airflow direction falls within a range from 0 (mm) to 1000 (mm) at the horizontal air-blowing position 302. In the example illustrated in FIG. 3, the first vertical air-blowing position is defined as 1000-2000. Therefore, the profile view 220 displays the first height-instruction icon 231, for example, at a position corresponding to a given position (e.g., intermediate position) within a range from 1000 to 2000.

In addition, the second vertical air-blowing position is defined as 0-1000. Therefore, the profile view 220 displays the second height-instruction icon 232, for example, at a position corresponding to a given position (e.g., intermediate position) within a range from 0 to 1000.

Figure 4:
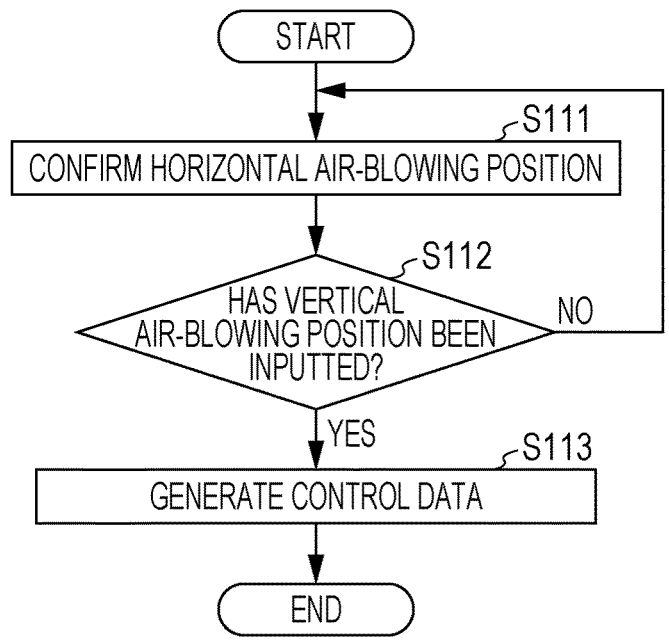
FIG. 4 is a flowchart illustrating an exemplary process of the communication device according to the first embodiment.

FIG. 4 is a flowchart illustrating an exemplary process of the communication device 100 according to the first embodiment. This flowchart illustrates a process to be carried out in a state in which the user has inputted the horizontal air-blowing position 302 and is to input the vertical air-blowing position 304.

The first detection unit 103 first confirms the horizontal air-blowing position 302 that has been inputted by the user (S111).

Then, the second detection unit 104 determines whether the user has inputted the vertical air-blowing position 304 (S112). The user inputs the vertical air-blowing position 304 by selecting either the first height-instruction icon 231 or the second height-instruction icon 232.

If the second detection unit 104 does not detect an input of the vertical air-blowing position 304 (NO in S112), the process returns to S111. Meanwhile, if the second detection unit 104 detects an input of the vertical air-blowing position 304 (YES in S112), the process proceeds to S113.

In S113, the generation unit 105 generates control data that specifies the airflow direction. The generation unit 105 obtains the horizontal airflow-direction component 212 from the horizontal installation position 301 and the horizontal air-blowing position 302 detected by the first detection unit 103. The generation unit 105 then obtains a vertical airflow-direction component from the vertical air-blowing position 304 detected by the second detection nit 104 and the vertical Installation position 303. The generation unit 105 associates the horizontal airflow-direction component 212 with the vertical airflow-direction component and generates the control data. The generated control data is stored in the buffer unit 106, and the output control unit 107 appends header information to the control data. The output control unit 108 then outputs the resulting control data to the network. Upon receiving this control data, the air conditioner 600 controls the airflow direction in accordance with the received control data.

Hereinafter, generation of the control data will be described. In the example illustrated in FIG. 3, for example, the coordinates of the horizontal installation position 301 are (0,0), and the coordinates of the horizontal air-blowing position 302 are (2200,2400). Therefore, the horizontal airflow-direction component 212, for example, is expressed by a two-dimensional vector of [(2200-0),(2400-0)]. In addition, the user may select the second vertical air-blowing position (0-1000) as the vertical air-blowing position 304. In this case, the generation unit 105 obtains the vertical airflow-direction component that corresponds to 0, which is the lower limit of the second vertical air-blowing position, by subtracting the vertical installation position 303 (:2000) from the lower limit of 0. In the case of this example, the vertical airflow-direction component that corresponds to the lower limit is calculated to be 0−2000=−2000. In addition, the generation unit 105 obtains the vertical airflow-direction component that corresponds to 1000, which is the upper limit of the second vertical air-blowing position, by subtracting the vertical installation position 303 (:2000) from the upper limit of 1000. In the case of this example, the vertical airflow-direction component that corresponds to the upper limit is calculated to be 1000−2000=−1000.

The generation unit 105 then generates data in which the horizontal airflow-direction component 212, the vertical airflow-direction component corresponding to the lower limit, and the vertical airflow-direction component corresponding to the upper limit are associated with one another, and this data serves as the control data.

Upon receiving this control data, the air conditioner 600 sets the Z-axis at the horizontal air-blowing position 302 in such a manner that the height of the air conditioner 600 corresponds to 0, and causes the longitudinal louvers to swing so as to blow the air, for example, in a range from −2000 (the vertical airflow-direction component corresponding to the lower limit) to −1000 (the vertical airflow-direction component corresponding to the upper limit) along the Z-axis. In addition, the air conditioner 600 causes the lateral louvers to swing within a predetermined angular range centered on the horizontal airflow-direction component 212. The longitudinal louvers are members for adjusting the airflow direction in the vertical direction, and the lateral louvers are members for adjusting the airflow direction in the horizontal direction. The airflow direction is controlled in the above-described manner.

In the meantime, when the user selects the first height-instruction icon 231, the longitudinal louvers may be controlled in the same manner as in the case in which the user selects the second height-instruction icon 232. The user who selects the first height-instruction icon 231 is a user who does not want to be hit directly by the air. Therefore, the predetermined angular range that is centered on the horizontal airflow-direction component 212 in which the lateral louvers swing may be set greater than the angular range set when the second height-instruction icon 232 is selected.

Figure 5:
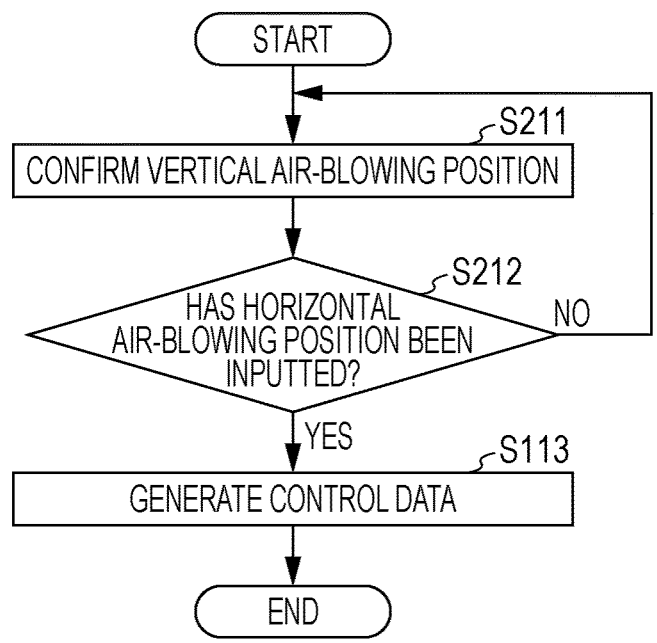
FIG. 5 is a flowchart illustrating another exemplary process of the communication device according to the first embodiment.

FIG. 5 is a flowchart illustrating another exemplary process of the communication device 100 according to the first embodiment. This flowchart indicates a process to be carried out in a state in which the user has inputted the vertical air-blowing position 304 and is to input the horizontal air-blowing position 302.

The second detection unit 104 first confirms the vertical air-blowing position 304 that has been inputted by the user (S211).

Then, the first detection unit 103 determines whether the user has inputted the horizontal air-blowing position 302 (S212). The user inputs the horizontal air-blowing position 302 by tapping the plan view 210 on a desired position or by swiping on the plan view 210 to move the displayed in-plane instruction icon 211.

If the first detection unit 103 does not detect an input of the horizontal air-blowing position 302 (NO in S212), the process returns to S211. Meanwhile, if the first detection unit 103 detects an input of the horizontal air-blowing position 302 (YES in S212), the process proceeds to S113. The process in S113 is the same as the process indicated in FIG. 4.

Figure 6:
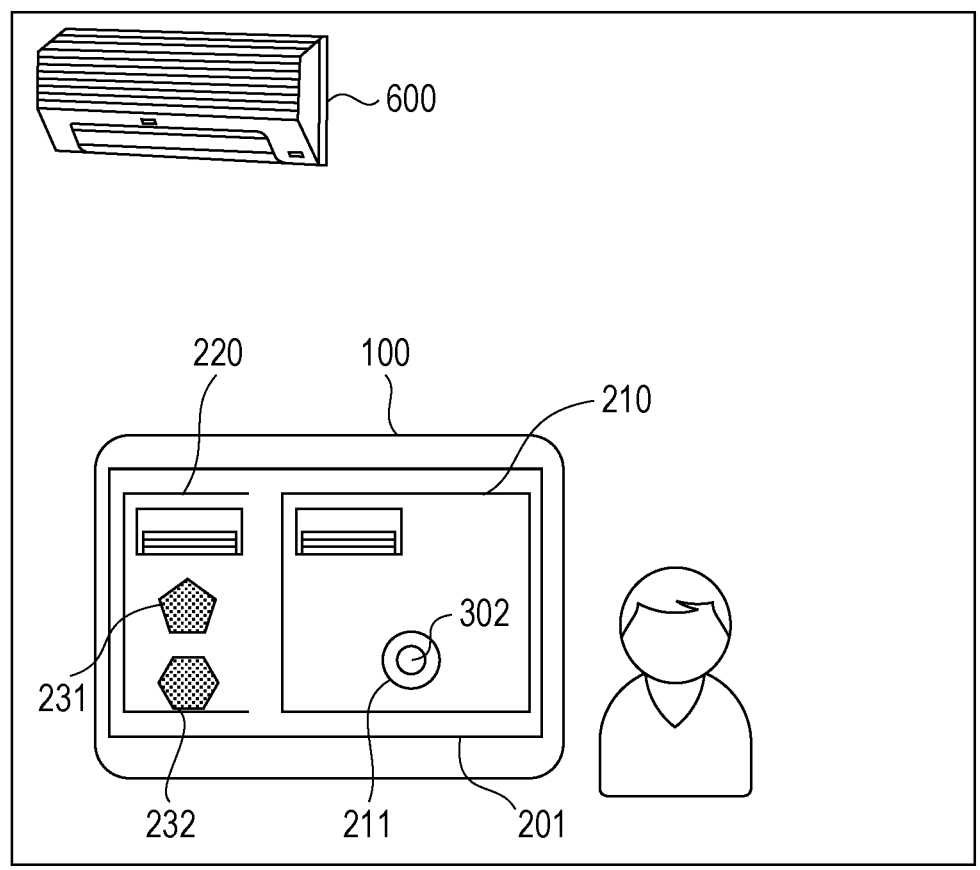
FIG. 6 is a conceptual diagram illustrating a state in which a user operates an air conditioner installed in a room by using a communication device.

FIG. 6 is a conceptual diagram illustrating a state in which the user operates the air conditioner 600 installed in a room by using the communication device 100. The display unit 102 of the communication device 100 displays the operation screen 201. In the example illustrated in FIG. 6, a tablet terminal provided with a touch panel, a smartphone, or a dedicated remote control is used as the communication device 100.

The user, holding the communication device 100, selects one of the first height-instruction icon 231 and the second height-instruction icon 232 that are displayed on the profile view 220 and inputs the horizontal air-blowing position 302 by using the plan view 210. The communication device 100 then generates control data and transmits the control data to the air conditioner 600. The air conditioner 600 controls the airflow direction in accordance with the control data.

In this manner, with the communication device 100 according to the first embodiment, the user can input the airflow direction of the air conditioner 600 through a simple operation, namely, by selecting the first height-instruction icon 231 or the second height-instruction icon 232 on the profile view 220 and selecting the horizontal air-blowing position 302 on the plan view 210.

In the first embodiment, the profile view 220 displays the two height-instruction icons 230, but the present disclosure is not limited to such an example. For example, the profile view 220 may display three or more height-instruction icons 230 that are associated with mutually different vertical air-blowing positions 304. In this case, the user can input the vertical air-blowing position 304 among three or more levels only by selecting one of the height-instruction icons 230.

In addition, in the first embodiment, the user selects one of the height-instruction icons 230 that are displayed in advance on the profile view 220 and associated with the respective vertical air-blowing positions 304. Alternatively, the user may input a desired vertical air-blowing position 304 on the profile view 220. This mode will be described later.

In addition, in the vertical air-blowing position 304 illustrated in FIG. 3, the first vertical air-blowing position and the second vertical air-blowing position each have a predetermined range. Alternatively, a value representing a single point may be defined. In this case, the air conditioner 600 may set the longitudinal louvers at a fixed position so that the air is blown only to the vertical air-blowing position 304 defined by the single point. Alternatively, the air conditioner 600 may cause the longitudinal louvers to swing within a predetermined angular range with the aforementioned single point serving as the reference.

Second Embodiment

A communication device 100 according to a second embodiment accepts preferred airflow directions inputted simultaneously by multiple users. In the present embodiment, elements that are identical to those in the first embodiment are given identical reference characters, and descriptions thereof will be omitted.

Figure 7:
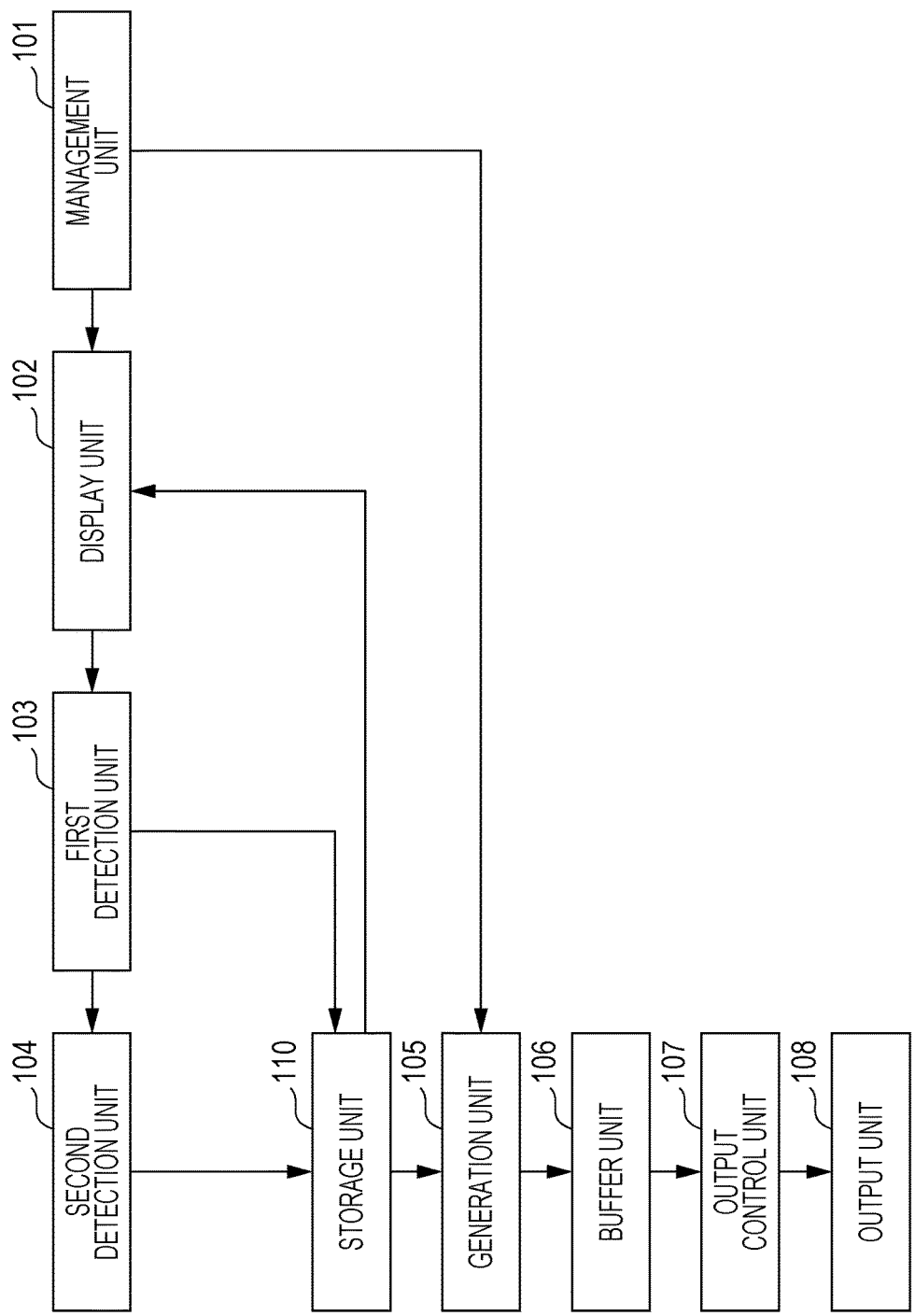
FIG. 7 is a block diagram illustrating an exemplary configuration of a communication device according to a second embodiment of the present disclosure.

FIG. 7 is a block diagram illustrating an exemplary configuration of the communication device 100 according to the second embodiment of the present disclosure. The communication device 100 illustrated in FIG. 7 includes a storage unit 110, in addition to the elements in the communication device 100 illustrated in FIG. 1.

In the present embodiment, the second detection unit 104 detects the vertical air-blowing position 304 inputted by a user in association with the horizontal air-blowing position 302 detected by the first detection unit 103, and stores the associated vertical air-blowing position 304 and horizontal air-blowing position 302 in the storage unit 110. Through this operation, the storage unit 110 stores the associated horizontal air-blowing position 302 and vertical air-blowing position 304 for each user.

The storage unit 110, for example, is constituted by a non-volatile or volatile storage device and stores the associated vertical blowing position 304 and horizontal air-blowing position 302 for each user.

The generation unit 105 generates control data from the associated vertical air-blowing position 304 and horizontal air-blowing position 302 for each user.

Figure 8:
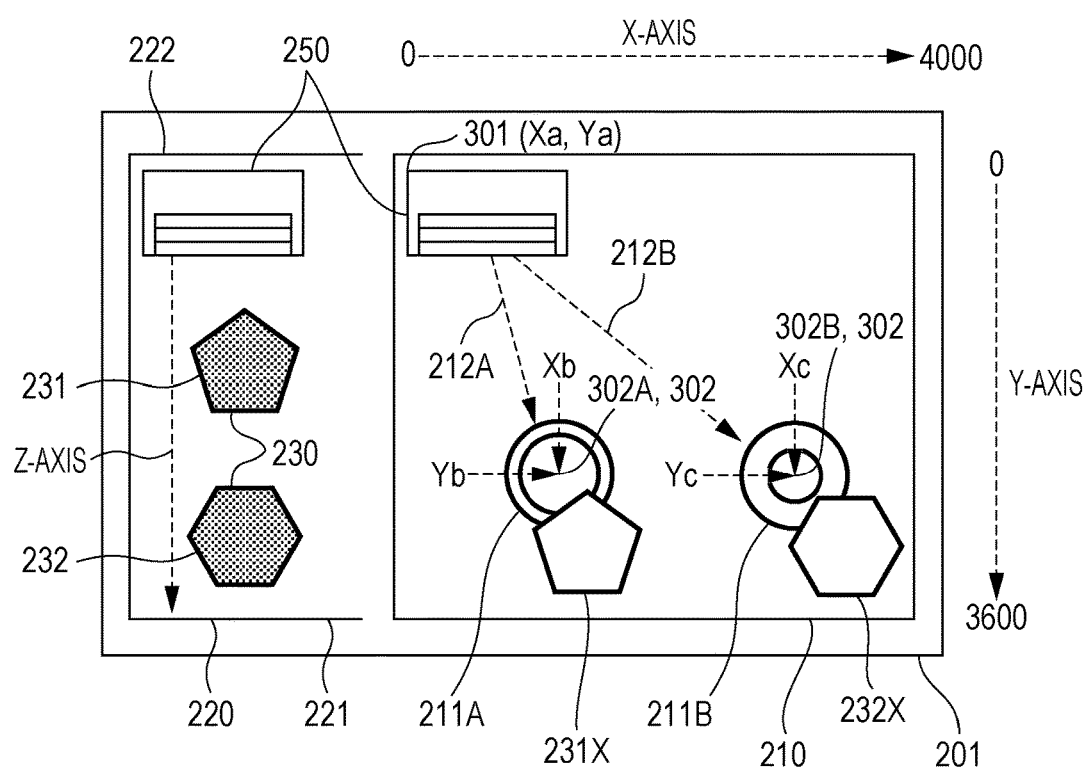
FIG. 8 illustrates an exemplary operation screen according to the second embodiment.

FIG. 8 illustrates an example of the operation screen 201 according to the second embodiment. In FIG. 8, an in-plane instruction icon 211A corresponds to an in-plane instruction icon 211 that indicates a horizontal air-blowing position 302A inputted by a user A. Meanwhile, an in-plane instruction icon 211B corresponds to an in-plane instruction icon 211 that indicates a horizontal air-blowing position 302B inputted by a user B.

An association icon 231X indicates that the first height-instruction icon 231 is associated with the in-plane instruction icon 211. Meanwhile, an association icon 232X indicates that the second height-instruction icon 232 is associated with the horizontal air-blowing position 302. The association icon 231X has a shape (pentagon in this example) that is identical to the shape of the first height-instruction icon 231 in order to indicate clearly that the first height-instruction icon 231 is associated with the corresponding horizontal air-blowing position 302. In addition, the association icon 232X has a shape (hexagon in this example) that is identical to the shape of the second height-instruction icon 232 in order to indicate clearly that the second height-instruction icon 232 is associated with the corresponding horizontal air-blowing position 302. In other words, the association icon 231X is a copy of the first height-instruction icon 231, and the association icon 232X is a copy of the second height-instruction icon 232.

In the example illustrated in FIG. 8, the user A has associated the first height-instruction icon 231 with the horizontal air-blowing position 302A, and thus the association icon 231X is displayed so as to partially overlap the in-plane instruction icon 211A. Meanwhile, the user B has associated the second height-instruction icon 232 with the horizontal air-blowing position 302B, and thus the association icon 232X is displayed so as to partially overlap the in-plane instruction icon 211B.

First Exemplary Operation

A first exemplary operation according to the second embodiment will be described. The user A first taps the plan view 210 on a desired position to input the horizontal air-blowing position 302A. Through this operation, the in-plane instruction icon 211A is displayed with its center located at the horizontal air-blowing position 302A. Then, the user B taps the plan view 210 on a desired position to input the horizontal air-blowing position 302B. Through this operation, the in-plane instruction icon 211B is displayed with its center located at the horizontal air-blowing position 302B.

Subsequently, the user A swipes to move the first height-instruction icon 231 in the profile view 220 onto the in-plane instruction icon 211A. Through this operation, the horizontal air-blowing position 302A is associated with the vertical air-blowing position 304 defined by the first height-instruction icon 231, and the associated horizontal air-blowing position 302A and vertical air-blowing position 304 are stored in the storage unit 110.

Then, the user B swipes to move the second height-instruction icon 232 ire the profile view 220 onto the in-plane instruction icon 211B. Through this operation, the horizontal air-blowing position 302B is associated with the vertical air-blowing position 304 defined by the second height-instruction icon 232, and the associated horizontal air-blowing position 302B and vertical air-blowing position 304 are stored in the storage unit 110.

An exemplary operation in which the users A and B input the respective horizontal air-blowing positions 302A and 302B and the users A and B then swipe to move the first height-instruction icon 231 and the second height-instruction icon 232 has been illustrated. However, the present embodiment is not limited to such an example. For example, the user A may successively input the horizontal air-blowing position 302 and swipe to move the first height-instruction icon 231, and the user B may successively input the horizontal air-blowing position 302 and swipe to move the second height-instruction icon 232.

In addition, although an example in which the user A swipes to move the first height-instruction icon 231 has been illustrated, in a case in which the user A wants to be hit directly by the air, the user A may swipe to move the second height-instruction icon 232.

Furthermore, although an example in which the user B swipes to move the second height-instruction icon 232 has been illustrated, in a case in which the user B does not want to be hit directly by the air, the user B may swipe to move the first height-instruction icon 231.

Second Exemplary Operation

In a second exemplary operation, the user A first inputs the horizontal air-blowing position 302A, as in the first exemplary operation. The user A then taps the first height-instruction icon 231. Thus, the association icon 231X for the in-plane instruction icon 211A is displayed. Through this operation, the horizontal air-blowing position 302A is associated with the vertical air-blowing position 304 defined by the first height-instruction icon 231.

Subsequently, the user B inputs the horizontal air-blowing position 302B and then taps the second height-instruction on 232, as in the operation by the user A. Through this operation, the horizontal air-blowing position 302B is associated with the vertical air-blowing position 304 defined by the second height-instruction icon 232.

Figure 9:
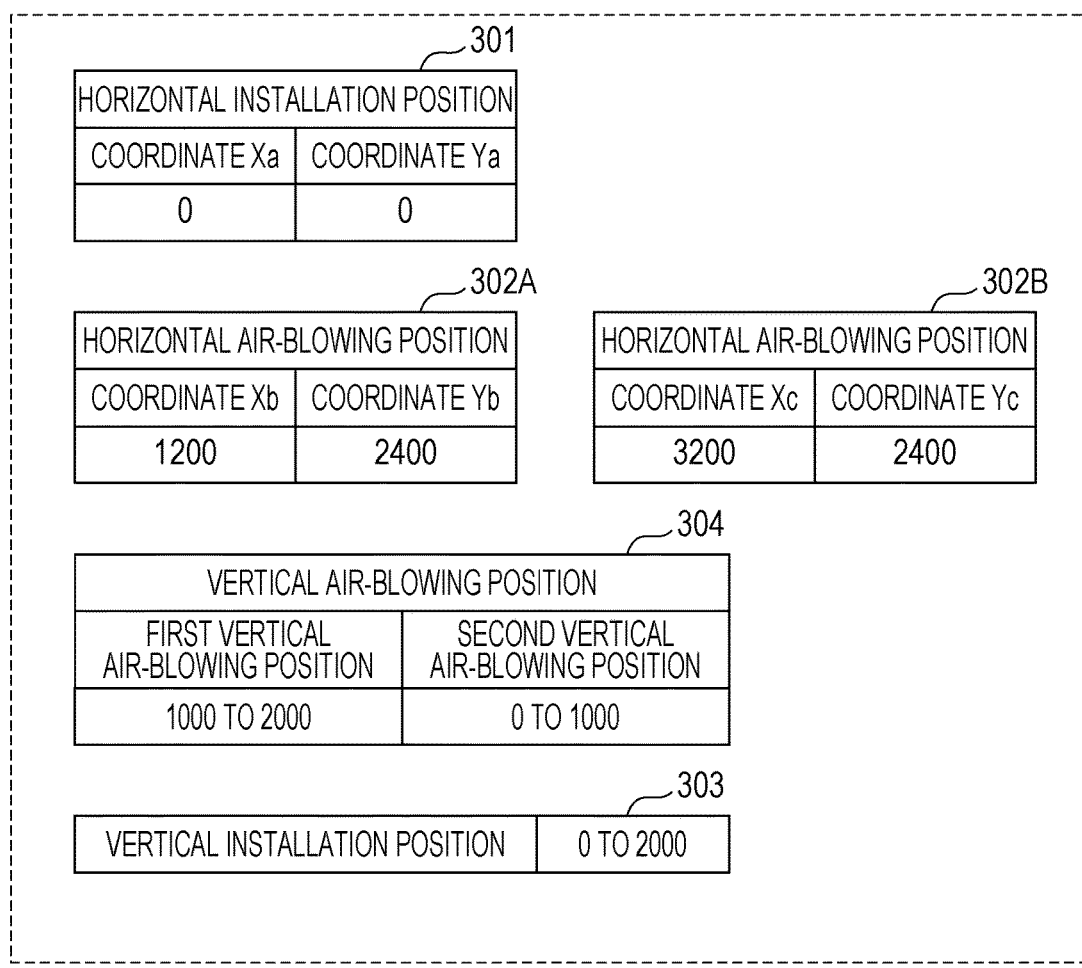
FIG. 9 illustrates exemplary data structures of various pieces of data to be used in the second embodiment.

FIG. 9 illustrates exemplary data structures of various pieces of data to be used in the second embodiment. FIG. 9 differs from FIG. 3 in that the users A and B each input the horizontal air-blowing position 302 and thus the two horizontal air-blowing positions 302, namely, the horizontal air-blowing position 302A and the horizontal air-blowing position 302B are present.

The horizontal air-blowing position 302A corresponds to a horizontal air-blowing position 302 inputted by the user A.

In the example illustrated in FIG. 9, the coordinates Xb and Yb for the horizontal air-blowing position 302A are 1200 and 2400, respectively.

The horizontal air-blowing position 302B corresponds to a horizontal air-blowing position 302 inputted by the user B. In the example illustrated in FIG. 9, the coordinate Xc and Yc for the horizontal air-blowing position 302B are 3200 and 2400, respectively.

Figure 10:
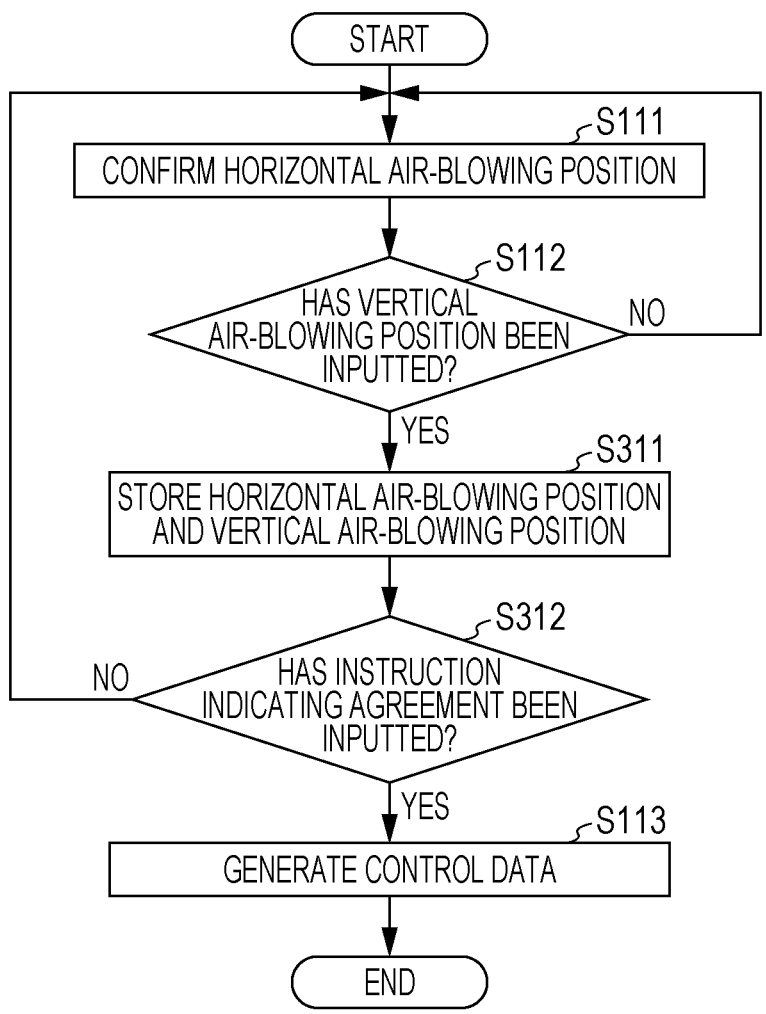
FIG. 10 is a flowchart illustrating an exemplary process of the communication device according to the second embodiment.

FIG. 10 is a flowchart illustrating an exemplary process of the communication device 100 according to the second embodiment. FIG. 10 differs from FIG. 4 in that S311 and S312 follow S112.

In S311, the second detection unit 104 associates the horizontal air-blowing position 302A inputted by the user A with the vertical air-blowing position 304 inputted by the user A, and stores the associated horizontal air-blowing position 302A and vertical air-blowing position 304 in the storage unit 110.

Then, the second detection unit 104 determines whether the user A has inputted an instruction indicating that the user A has agreed that the control data is to be transmitted to the air conditioner 600 (S312). If the second detection unit 104 detects an input of such an instruction (YES in S312), the process proceeds to S113. Meanwhile, if the second detection unit 104 does not detect an input of such an instruction (NO in S312), the process returns to S111. Upon the process returning to S111, the processes in S111 through S311 are carried out with respect to the user B. Thus, the horizontal air-blowing position 302B is associated with the vertical air-blowing position 304 inputted by the user B, and the associated horizontal air-blowing position 302B and vertical air-blowing position 304 are stored in the storage unit 110.

Through these processes, the storage unit 110 stores the associated horizontal air-blowing position 302 and vertical air-blowing position 304 for the user A, and the associated horizontal air-blowing position 302B and vertical air-blowing position 304 for the user B.

In S113, the generation unit 105 generates control data from the associated horizontal air-blowing position 302 and vertical air-blowing position 304 stored in the storage unit 110 for each user.

Hereinafter, generation of the control data will be described. In the example illustrated in FIG. 9, for example, the coordinates for the horizontal installation position 301 are (0,0), and the coordinates for the horizontal air-blowing position 302A are (1200,2400). Therefore, a horizontal airflow-direction component 212A is calculated to be [(1200-0),(2400-0)]. In addition, the coordinates for the horizontal air-blowing position 302B are (3200,2400), and thus a horizontal airflow-direction component 212B is calculated to be [(3200-0),(2400-0)].

The vertical air-blowing position 304 inputted by the user A is the first vertical air-blowing position (1000-2000), and thus the generation unit 105 calculates a vertical airflow-direction component AU that corresponds to the upper limit of 2000 and a vertical airflow-direction component AD that corresponds to the lower limit of 1000, as in the first embodiment.

In addition, the vertical air-blowing position 304 inputted by the user B is the second vertical air-blowing position (0-1000), and thus the generation unit 105 calculates a vertical airflow-direction component BU that corresponds to the upper limit of 1000 and a vertical airflow-direction component BD that corresponds to the lower limit of 0, as in the first embodiment.

The generation unit 105 then generates a data group that includes data in which the horizontal airflow-direction component 212A is associated with the vertical airflow-direction components AU and AD and data in which the horizontal airflow-direction component 212B is associated with the vertical airflow-direction components BU and BD, and the generated data group serves as the control data.

Upon receiving the control data, the air conditioner 600 causes the lateral louvers to swing within a predetermined angular range that contains the horizontal airflow-direction components 212A and 212B. The air conditioner 600 causes the longitudinal louvers to swing within a fan-shaped range defined by the vertical airflow-direction components AU and AD, in a case in which the lateral louvers swing to blow the air within a predetermined angular range centered on the horizontal airflow-direction component 212A. Meanwhile, the air conditioner 600 causes the longitudinal louvers to swing within a fan-shaped range defined by the vertical airflow-direction components BU and BD, in a case in which the lateral louvers swing to blow the air within a predetermined angular range centered on the horizontal airflow-direction component 212B.

Through this operation, the air can be prevented from directly hitting the user A who does not want to be hit directly by the air, and the air can directly hit the user B who wants to be hit directly by the air. Accordingly, the requirements of both users A and B can be satisfied.

In the second embodiment, an example in which the two users A and B input the respective horizontal air-blowing positions 302A and 302B has been illustrated. The present disclosure, however, is not limited to such an example. For example, three or more users may input respective horizontal air-blowing positions 302. In a case in which three users input the respective horizontal air-blowing positions 302, for example, the processes in S111, S112, and S311 of FIG. 10 loop three times.

In addition, the generation unit 105 may generate control data from the horizontal air-blowing positions 302 and the vertical air-blowing positions 304 input by the respective three users.

Third Embodiment

Figure 12:
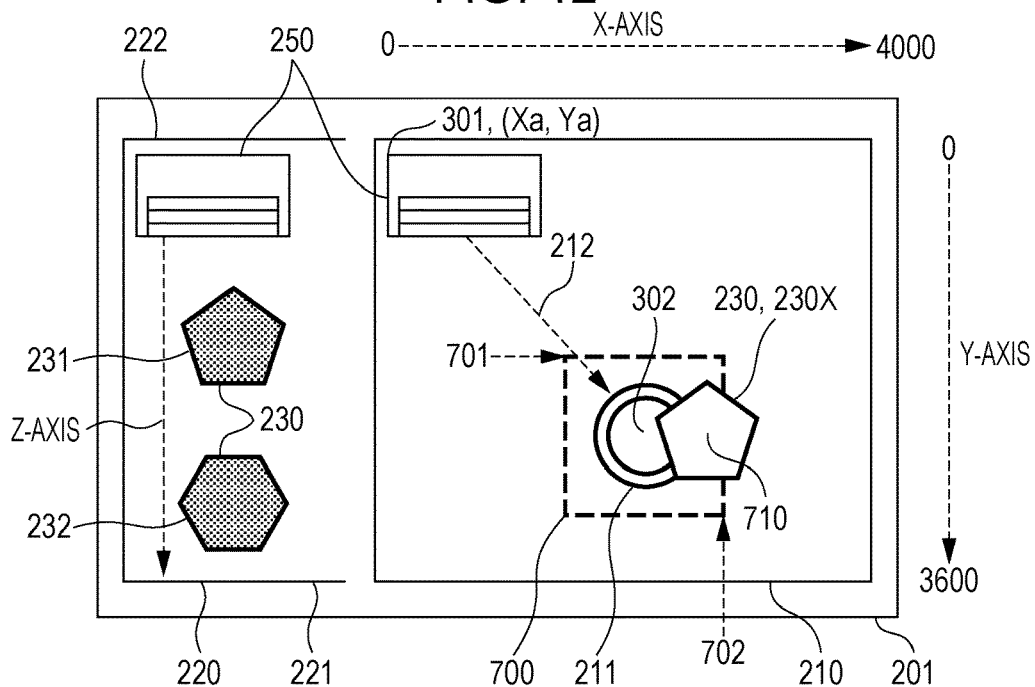
FIG. 12 illustrates an exemplary operation screen according to the third embodiment.

A communication device 100 according to a third embodiment sets an effective range 700 on the plan view 210, as illustrated in FIG. 12.

Figure 11:
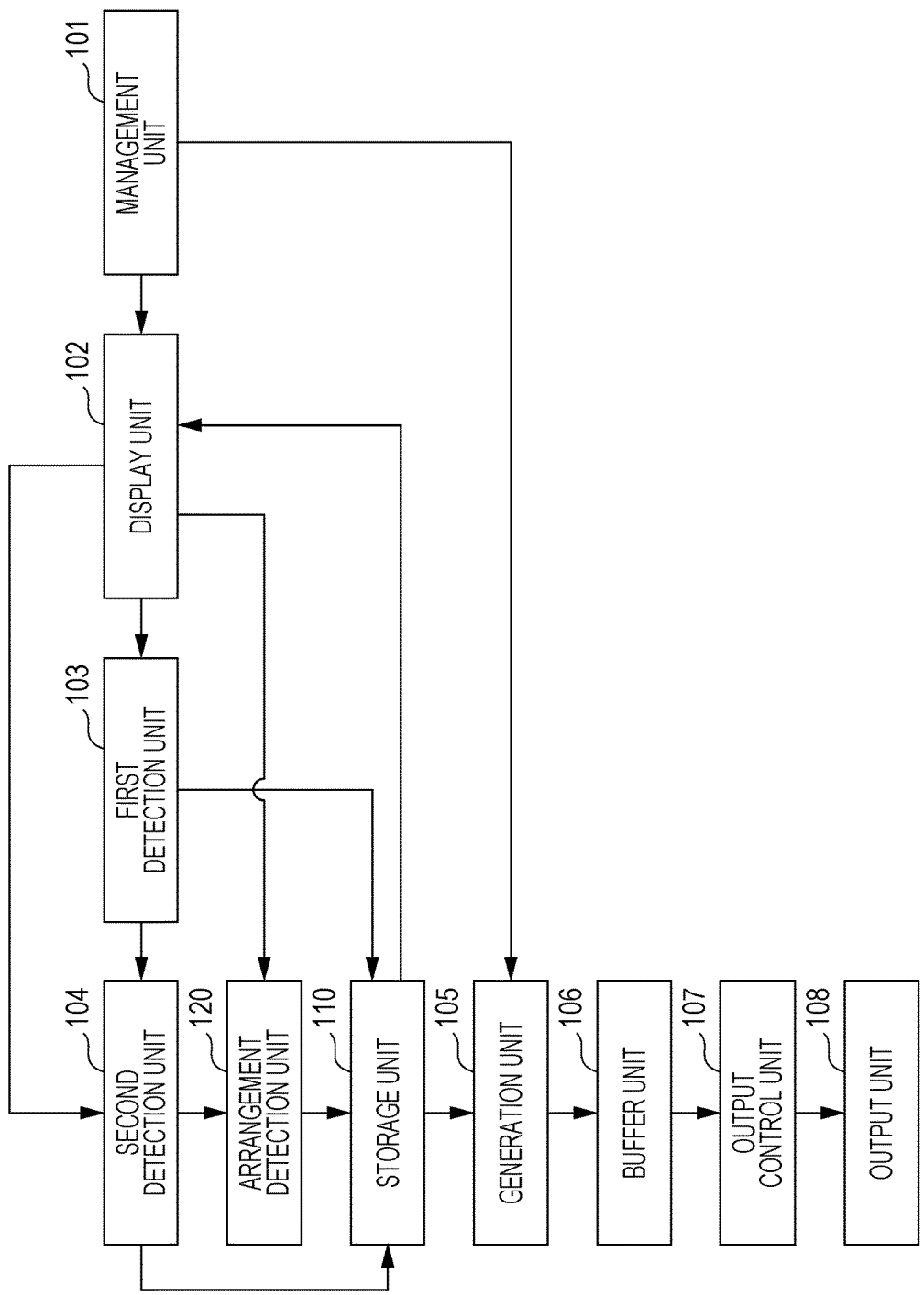
FIG. 11 is a block diagram illustrating an exemplary configuration of a communication device according to a third embodiment of the present disclosure.

FIG. 11 is a block diagram illustrating an exemplary configuration of the communication device 100 according to the third embodiment of the present disclosure. The communication device 100 according to the third embodiment includes an arrangement detection unit 120, in addition to the elements in the communication device 100 according to the second embodiment.

In the third embodiment, the management unit 101 manages the effective range 700 as well. The effective range 700 will be described later.

The arrangement detection unit 120 detects the position of the height-instruction icon 230 on the plan view 210, which has been moved by the user.

In the third embodiment, the storage unit 110 stores the horizontal air-blowing position 302 detected by the first detection unit 103, the user-selected height-instruction icon 230 detected by the second detection unit 104, and the moved position (hereinafter, referred to as an icon position 710) of the height-instruction icon 230 detected by the arrangement detection unit 120, which are associated with one another.

Upon the height-instruction icon 230 being dropped within the effective range 700, the generation unit 105 determines that the input of the vertical air-blowing position 304 by the user is valid. Thus, the generation unit 105 reads out the horizontal air-blowing position 302 and the vertical air-blowing position 304 stored in the storage unit 110 and generates control data.

FIG. 12 illustrates an example of the operation screen 201 according to the third embodiment.

The effective range 700 is a rectangular region that is somewhat larger than the in-plane instruction icon 211 that has its center located at the horizontal air-blowing position 302. When the user swipes to move the in-plane instruction icon 211, the effective range 700 moves so as to follow the swipe. The effective range 700 may or may not be displayed.

If a mode in which the user swipes to move the height-instruction icon 230 onto the horizontal air-blowing position 302 so as to input the vertical air-blowing position 304 is employed, there needs a criterion for determining how dose the height-instruction icon 230 needs to be moved to the horizontal air-blowing position 302 in order for the user input to be valid. If, for example, a mode in which the icon position 710 for the height-instruction icon 230 has to be strictly positioned onto the horizontal air-blowing position 302 in order for the user input to be valid is employed, such a rode makes it hard for the user to operate the communication device 100. In the meantime, if a mode in which the user input is determined to be valid even when the height-instruction icon 230 is greatly spaced apart from the horizontal air-blowing position 302 is employed, when, for example, multiple users input the respective horizontal air-blowing positions 302, it is difficult to determine with which one of the horizontal air-blowing positions 302 the height-instruction icon 230 has been associated. Therefore, in the third embodiment, the effective range 700 is provided, and the user operation is determined to be valid if the height-instruction icon 230 is dropped while the icon position 710 is located within the effective range 700. Through this configuration, even when multiple horizontal air-blowing positions 302 are present, a process of determining with which one of the horizontal air-blowing positions 302 the height-instruction icon 230 has been associated becomes easy without making it hard for the user to operate the communication device 100.

A starting coordinate 701 indicates the coordinate of the upper left vertex of the effective range 700. An ending coordinate 702 indicates the coordinate of the lower right vertex of the effective range 700.

An association icon 230X is displayed when the user drops the height-instruction icon 230 within the effective range 700 on the plan view 210, and is an icon for clearly indicating that the vertical air-blowing position 304 inputted by the user has been associated with the horizontal air-blowing position 302 inputted by the user. In the example illustrated in FIG. 12, the user has selected the first height-instruction icon 231, and thus the shape (pentagon in this example) of the association icon 230X is the same as the shape of the first height-instruction icon 231. If the user selects the second height-Instruction icon 232, the shape (hexagon in this example) of the association icon 230X is the same as the shape of the second height-instruction icon 232.

When the height-instruction icon 230 is dropped, if the icon position 710 is located within the effective range 700, the user input is determined to be valid, and control data is generated from the horizontal air-blowing position 302 and the vertical air-blowing position 304 defined by the height-instruction icon 230 selected by the user.

Figure 13:
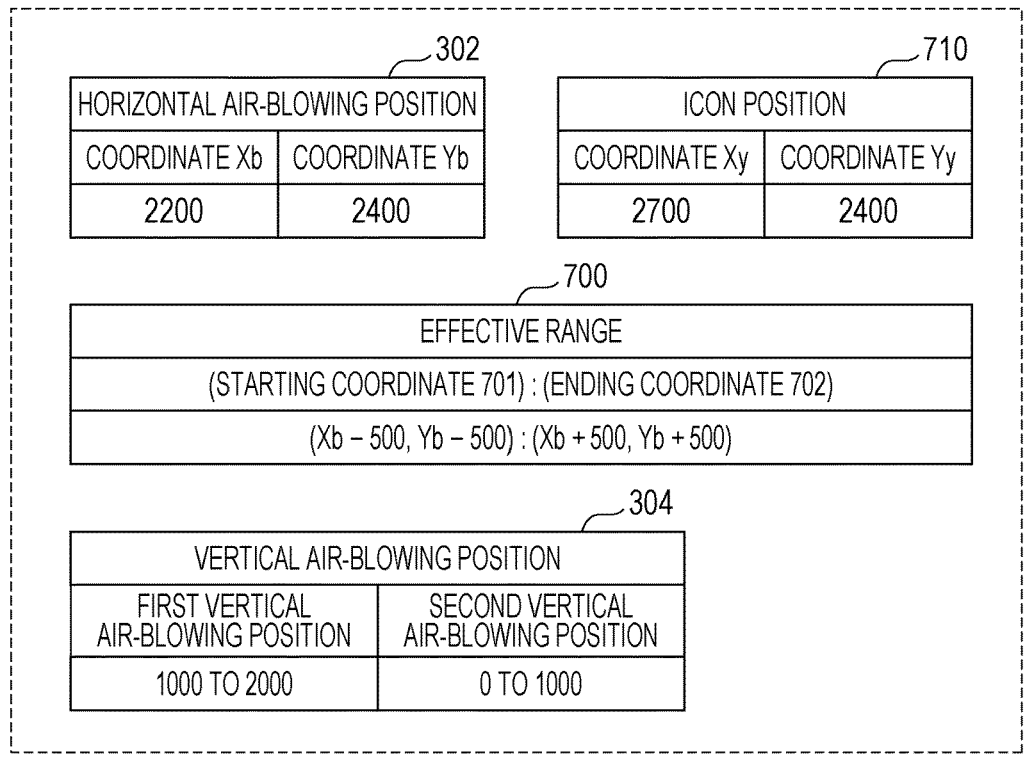
FIG. 13 illustrates exemplary data structures of various pieces of data to be used in the third embodiment.

FIG. 13 illustrates exemplary data structures of various pieces of data to be used in the third embodiment.

FIG. 13 differs from FIG. 3 in that the icon position 710 and the effective range 700 are added. Although the horizontal installation position 301 and the vertical installation position 303 are also used in the third embodiment, they are omitted in FIG. 13.

The icon position 710 indicates the position where the height-instruction icon 230 is dropped. The icon position 710, for example, is indicated by the coordinates for the center position of the height-instruction icon 230 held when the height-instruction icon 230 is dropped. In the example illustrated in FIG. 13, the coordinate Xy and the coordinate Yy of the icon position 710 are, respectively, 2700 and 2400.

The effective range 700 is defined by the starting coordinate 701 and the ending coordinate 702. In the example illustrated in FIG. 13, the starting coordinate 701 is defined by a value obtained by subtracting 500 from the coordinate Xb of the horizontal air-blowing position 302 and a value obtained by subtracting 500 from the coordinate Yb of the horizontal air-blowing position 302. Meanwhile, the ending coordinate 702 is defined by a value obtained by adding 500 to the coordinate Xb of the horizontal air-blowing position 302 and a value obtained by adding 500 to the coordinate Yb of the horizontal air-blowing position 302.

Figure 14:
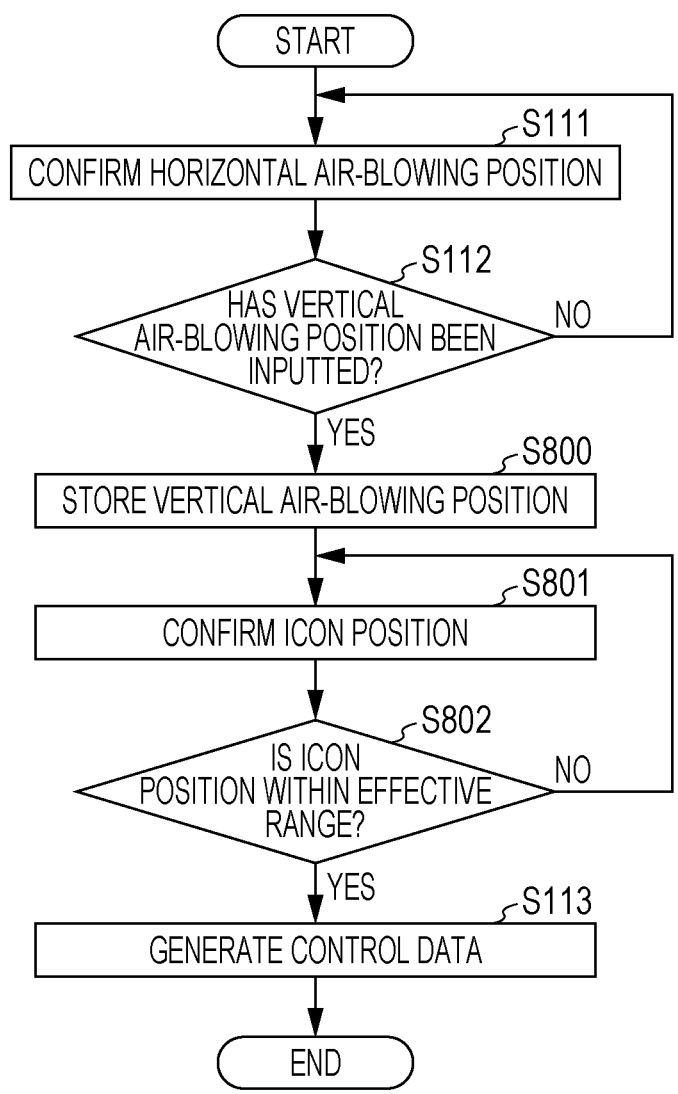
FIG. 14 is a flowchart illustrating an exemplary process of the communication device according to the third embodiment.

FIG. 14 is a flowchart illustrating an exemplary process of the communication device 100 according to the third embodiment. The flowchart illustrated in FIG. 14 differs from the flowchart illustrated in FIG. 4 in that S800, S801, and S802 follow S112.

In S800, the second detection unit 104 associates the vertical air-blowing position 304 defined by the height-instruction icon 230 selected by the user with the horizontal air-blowing position 302 detected by the first detection unit 103, and stores the associated vertical air-blowing position 304 and horizontal air-blowing position 302 in the storage unit 110.

In S801, the arrangement detection unit 120 confirms he icon position 710 where the height-instruction icon 230 has been dropped.

In S802, the generation unit 105 determines whether the icon position 710 where the height-instruction icon 230 has been dropped is within the effective range 700.

If the icon position 710 is within the effective range 700 (YES in S802), the process proceeds to S113. Meanwhile, if the icon position 710 is outside the effective range 700 (NO in S802), the generation unit 105 returns the process to S801 and waits for the height-instruction icon 230 to be dropped within the effective range 700.

Subsequently, a specific example of the process of the communication device 100 according to the third embodiment will be described with reference to FIG. 13. The second detection unit 104 first associates the horizontal air-blowing position 302 [(Xb=2200),(Yb=2400)] detected by the first detection unit 103 with the vertical air-blowing position 304 detected by the second detection unit 104, and stores the associated horizontal air-blowing position 302 and vertical air-blowing position 304 in the storage unit 110. In this example, the user has selected the first height-instruction icon 231. Thus, the vertical air-blowing position 304 is 1000-2000.

Then, the arrangement detection unit 120 detects the icon position 710 [(Xy=2700),(Yy=2400)] where the first height-instruction icon 231 has been dropped.

Thereafter, the generation unit 105 substitutes 2200 for Xb and 2400 for Yb in {starting coordinate 701 [(Xb−500), (Yb−500)]:ending coordinate 702 [(Xb+500),(Yb+500)]} so as to set the effective range 700.

Through this operation, the effective range 700 is set to a rectangular region defined by [(2200−500),(2400−500)]: [(2200+500),(2400+500)].

In this case, the coordinates of the icon position 710 are [(Xy=2700),(Yy=2400)], which falls within the effective range 700. Thus, the generation unit 105 determines that the user input is valid.

The generation unit 105 then generates control data from the horizontal installation position 301 [(Xa=0),(Ya=0)], the horizontal air-blowing position 302 [(Xb=2200), (Yb=2400)], the vertical installation position 303, and the vertical air-blowing position 304 (1000-2000), as in the first embodiment.

An example in which a single horizontal air-blowing position 302 is inputted has been described in the third embodiment. Alternatively, two or more horizontal air-blowing positions 302 may be inputted. In this case, the generation unit 105 may set the effective range 700 for each horizontal air-blowing position 302 and determine whether an input is valid for each horizontal air-blowing position 302.

Fourth Embodiment

In a fourth embodiment, on the plan view 210, it is determined whether the air conditioner 600 can actually blow the air to the horizontal air-blowing position 302 and the vertical air-blowing position 304 inputted by the user, and if the air conditioner 600 cannot blow the air as inputted, the user is notified to that effect. In the present embodiment, elements that are identical to those in the first through third embodiments are given identical reference characters, and descriptions thereof will be omitted.

Figure 15:
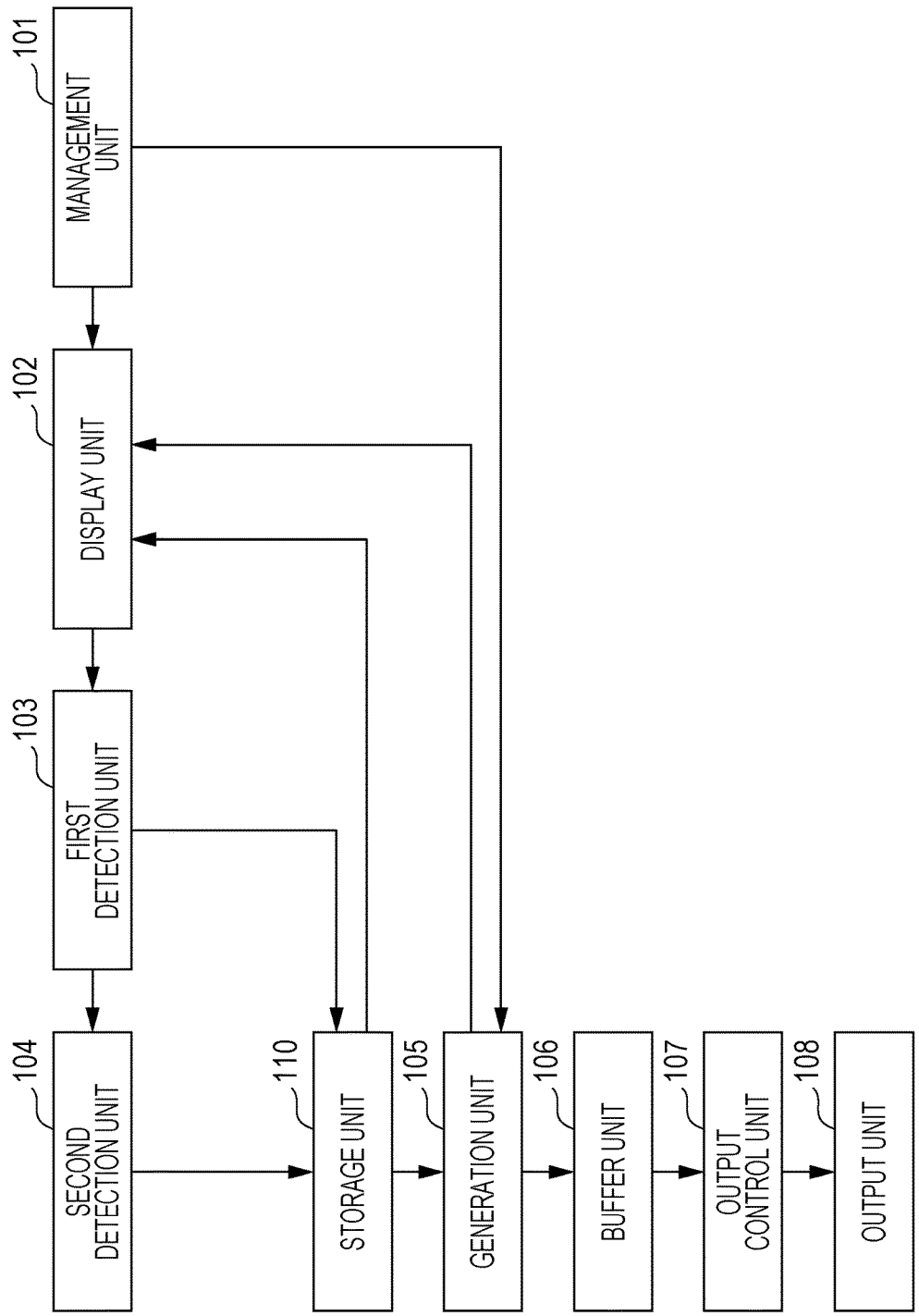
FIG. 15 is a block diagram illustrating an exemplary configuration of a communication device according to a fourth embodiment.

FIG. 15 is a block diagram illustrating an exemplary configuration of the communication device 100 according to the fourth embodiment.

In the fourth embodiment, the management unit 101 manages an effective range 1702 that corresponds to the first height-instruction icon 231 and an effective range 1703 that corresponds to the second height-instruction icon 232.

In the fourth embodiment, the second detection unit 104 detects the vertical air-blowing position 304 that the user has inputted in association with the horizontal air-blowing position 302 detected by the first detection unit 103, and stores the associated vertical air-blowing position 304 and horizontal air-blowing position 302 in the storage unit 110.

In the fourth embodiment, in a case in which the horizontal air-blowing position 302 is associated with the vertical air-blowing position 304 defined by the first height-instruction icon 231, the generation unit 105 sets the effective range 1702 on the plan view 210 for determining whether the user input is valid. If the horizontal air-blowing position 302 is outside the effective range 1702, the generation unit 105 displays, in the display unit 102, an invalid mark 950 indicating that the user input is invalid.

Meanwhile, in a case in which the horizontal air-blowing position 302 is associated with the vertical air-blowing position 304 defined by the second height-instruction icon 232, the generation unit 105 sets the effective range 1703 on the plan view 210 for determining whether the user input is valid. If the horizontal air-blowing position 302 is outside the effective range 1703, the generation unit 105 displays, in the display unit 102, the invalid mark 950 indicating that the put of the vertical air-blowing position 304 is invalid.

Figure 16:
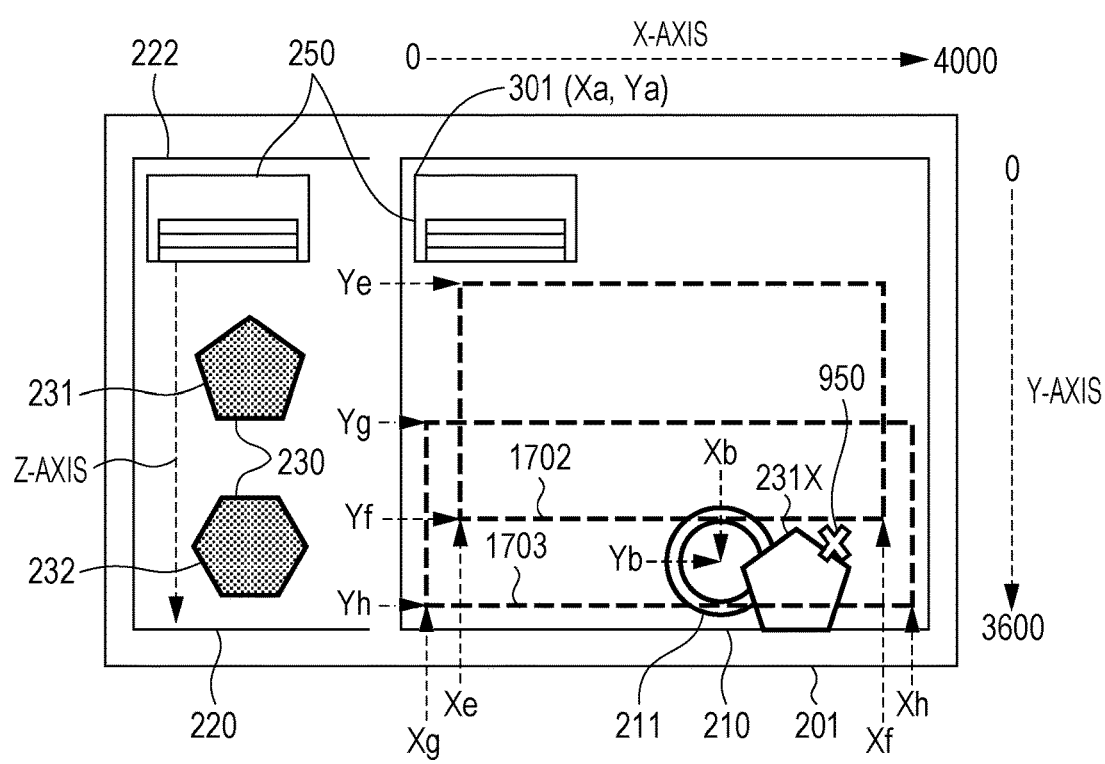
FIG. 16 illustrates an exemplary operation screen according to the fourth embodiment.

FIG. 16 illustrates an example of the operation screen 201 according to the fourth embodiment.

The effective range 1702 indicates a range on the plan view 210 in which the horizontal air-blowing position 302 can be specified in relation to the vertical air-blowing position 304 defined by the first height-instruction icon 231.

The effective range 1703 indicates a range on the plan view 210 in which the horizontal air-blowing position 302 can be specified in relation to the vertical air-blowing position 304 defined by the second height-instruction icon 232.

The effective range 1702 is a rectangular region defined by the upper left vertex (Xe,Ye) and the lower right vertex (Xf Yf). Meanwhile, the effective range 1703 is a rectangular region defined by the upper left vertex (Xg,Yg) and the lower right vertex (Xh,Yh).

The length of the effective range 1702 in the X-axis direction is set somewhat smaller than the length of the effective range 1703 in the X-axis direction. In addition, the width of the effective range 1702 in the Y-axis direction is set somewhat greater than the width of the effective range 1703 in the Y-axis direction. Furthermore, the effective range 1702 as a whole is set closer to the air-conditioner icon 250 than the effective range 1703.

The effective ranges 1702 and 1703 are set in this manner due to a limitation that the air conditioner 600 can blow the air to a position higher than its own position but cannot blow the air to a position lower than its own position in the vicinity of the air conditioner 600 and a limitation that the air conditioner 600 can blow the air to a position lower than its own position but cannot blow the air to a position higher than its own position in a location far from the air conditioner 600. In other words, in a case in which the user has selected the second height-instruction icon 232, the air conditioner 600 cannot blow the air to the horizontal air-blowing position 302 that is set outside the effective range 1703. Meanwhile, in a case in which the user has selected the first height-instruction icon 231, the air conditioner 600 cannot blow the air to the horizontal air-blowing position 302 that is set outside the effective range 1702.

Accordingly, in the fourth embodiment, the effective range 1702 or 1703 that corresponds to the height-instruction icon 230 selected by the user is set on the plan view 210, and if the horizontal air-blowing position 302 inputted by the user is outside the effective range 1702 or 1703, the air conditioner 600 notifies the user that the air cannot be blown to the position that the user has requested. Through this configuration, even in a case in which the air conditioner 600 cannot blow the air to the position that the user has requested, the user can have a sense of acceptance. In addition, the air conditioner 600 can prompt the user to input an air-blowing position within a range in which the air conditioner 600 can blow the air.

The positions and the sizes of the effective ranges 1702 and 1703 can be set to the positions and the sizes that are set in advance in accordance with the range in which the air conditioner 600 can blow the air and the vertical air-blowing positions 304 defined by the first height-instruction icon 231 and the second height-instruction icon 232. The effective ranges 1702 and 1703 may or may not be displayed.

The invalid mark 950 notifies the user that he input of the horizontal air-blowing position 302 is invalid, in a case in which the horizontal air-blowing position 302 inputted by the user is outside the effective range 1702 or 1703 on the plan view 210. In the example illustrated in FIG. 16, the invalid mark 950 is represented, for example, by an X, but this is merely an example, and any mark that can notify the user that the input of the horizontal air-blowing position 302 is invalid can be employed. In addition, in the example illustrated in FIG. 16, the invalid mark 950 is displayed in the vicinity of the association icon 231X.

Figure 17:
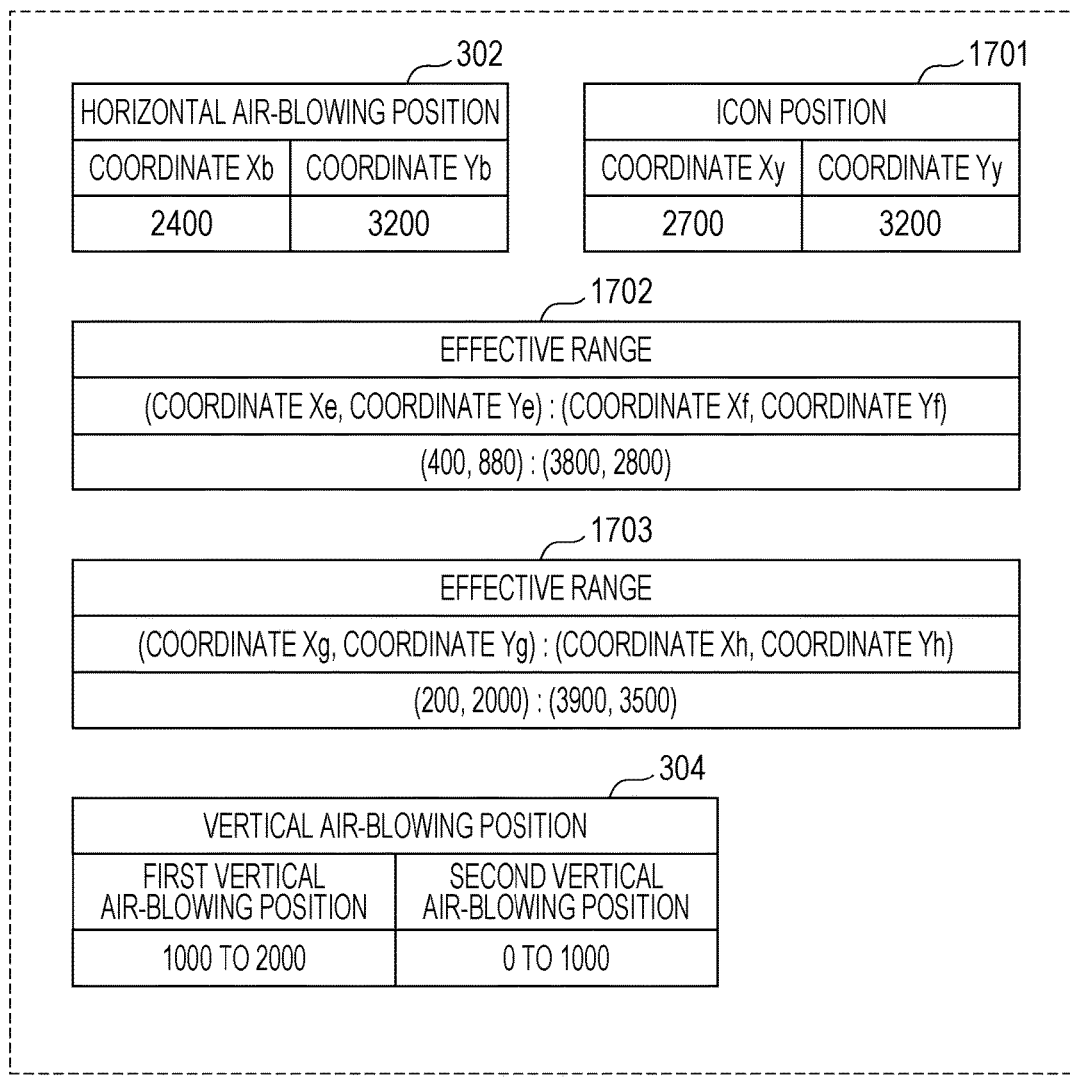
FIG. 17 illustrates exemplary data structures of various pieces of data to be used in the communication device according to the fourth embodiment.

FIG. 17 illustrates exemplary data structures of various pieces of data to be used in the communication device 100 according to the fourth embodiment. FIG. 17 differs from FIG. 13 in that, in place of the effective range 700, the two effective ranges 1702 and 1703 are provided. Although the horizontal installation position 301 and the vertical installation position 303 are also used in the fourth embodiment, they are omitted in FIG. 17.

The effective range 1702 is a rectangular region defined by the upper left vertex [(Xe=400),(Ye=880)] and the lower right vertex [(Xf=3800),(Yf=2800)].

The effective range 1703 is a rectangular region defined by the upper left vertex [(Xg=200),(Yg=2000)] and the lower right vertex [(Xh=3900),(Yh=3500)].

Subsequently, a specific example of the process of the communication device 100 according to the fourth embodiment will be described with reference to FIG. 17.

The first detection unit 103 first detests the horizontal air-blowing position [(Xb=2400),(Yb=3200)]. The user, for example, inputs the horizontal air-blowing position 302 [(Xb=2400),(Yb=3200)] by tapping the plan view 210. At this point, the plan view 210 displays the in-plane instruction icon 211 with its center located at the horizontal air-blowing position 302.

Subsequently, the second detection unit 104 determines whether the horizontal air-blowing position 302 is associated with the vertical air-blowing position 304 defined by the first height-instruction icon 231 or the second height-instruction icon 232. If the user is to associate the horizontal air-blowing position 302 with the vertical air-blowing position 304 defined by the first height-instruction icon 231, the user swipes to move the first height-instruction icon 231 onto the in-plane instruction icon 211. Meanwhile, if the user is to associate the horizontal air-blowing position 302 with the vertical air-blowing position 304 defined by the second height-instruction icon 232, the user swipes to move the second height-instruction icon 232 onto the in-plane instruction icon 211

The user may associate the horizontal air-blowing position 302 with the vertical air-blowing position 304 defined by the first height-instruction icon 231. In this case, the vertical air-blowing position 304 is 1000-2000.

Subsequently, the generation unit 105 sets, on the plan view 210, the effective range 1702 defined by the first height-instruction icon 231. The effective range 1702 is a rectangular region defined by [(Xe=400),(Ye=880)]: [(Xf=3800),(Yf=2800)].

In this case, the coordinates of the horizontal air-blowing position 302 are [(Xy=2400),(Yy=3200)], which is outside the effective range 1702. Thus, the generation unit 105 determines that the user input is invalid and displays the invalid mark 950 on the display unit 102. The invalid mark 950 is displayed, for example, at a position [(Xy=2900), (Yy=3200)] in the vicinity of the icon position 1701 [(Xy=2700),(Yy=3200)] of the association icon 231X.

The generation unit 105 then generates control data from the horizontal installation position 301 [(Xa=0),(Ya=0)], the vertical installation position 303 (2000), the horizontal air-blowing position 302 [(Xb=2400),(Yb=3200)], and the vertical air-blowing position 304 (1000-2000), as in the first embodiment.

Figure 18:
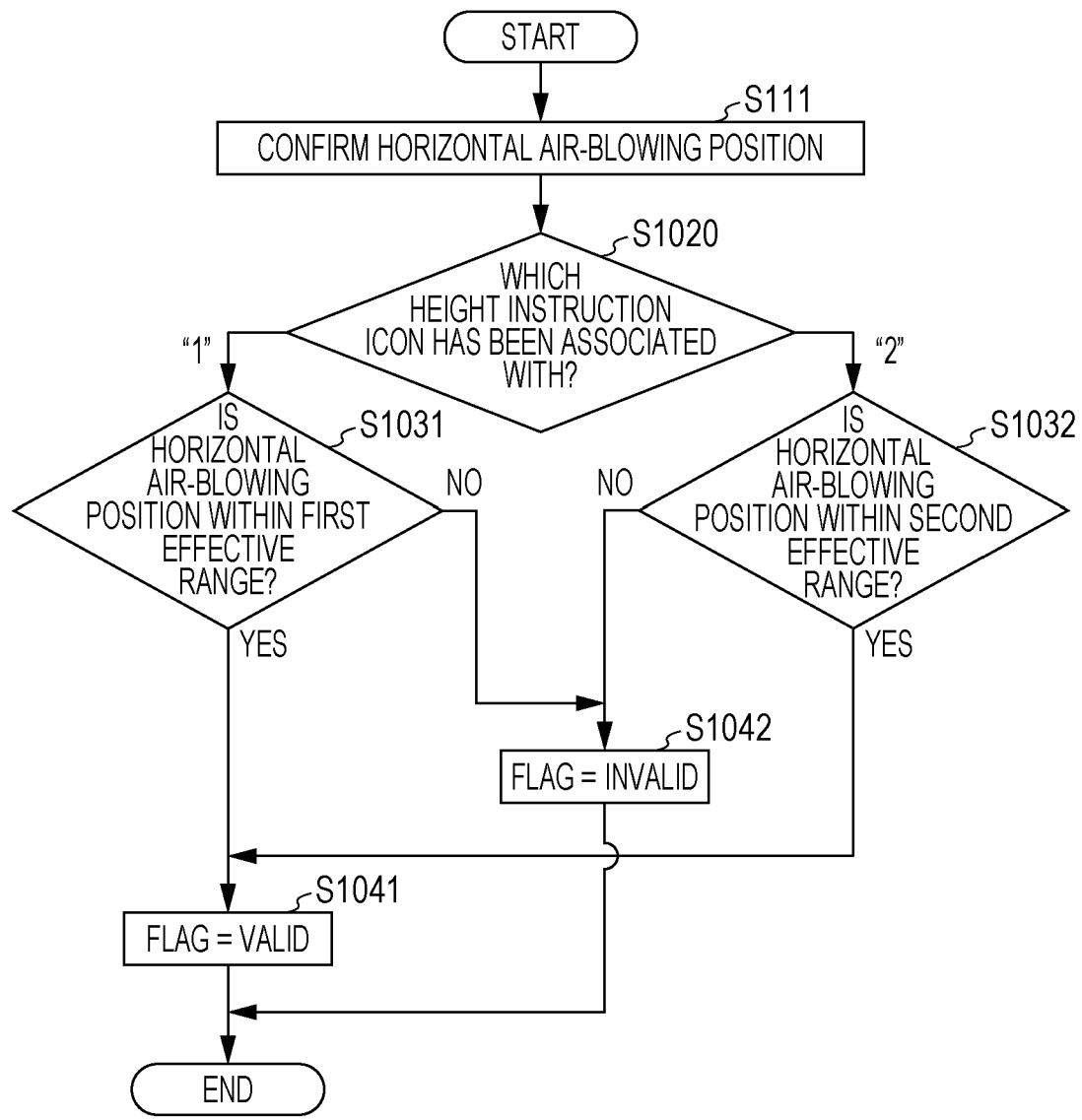
FIG. 18 is a flowchart illustrating an exemplary process of the communication device according to the fourth embodiment.

FIG. 18 is a flowchart illustrating an exemplary process of the communication device 100 according to the fourth embodiment.

The generation unit 105 first confirms the horizontal air-blowing position 302 that has been inputted by the user (S111).

Subsequently, the generation unit 105 determines with which one of the first height-instruction icon 231 and the second height-instruction icon 232 the user has associated the horizontal air-blowing position 302 (S1020). If the first height-instruction icon 231 is associated with the horizontal air-blowing position 302 ("1" in S1020), the generation unit 105 sets the effective range 1702 on the plan view 210. Then, if the horizontal air-blowing position 302 is within the effective range 1702 (YES in S1031), the generation unit 105 sets "valid" in a flag on the display unit 102 that indicates whether the user instruction is valid (S1041).

Meanwhile, if the horizontal air-blowing position 302 is outside the effective range 1702 (NO in S1031), the generation unit 105 sets "invalid" in the flag on the display unit 102 (S1042).

In S1020, if the second height-instruction icon 232 is associated with the horizontal air-blowing position 302 ("2" in S1020), the generation unit 105 sets the effective range 1703 on the plan view 210. Then, if the horizontal air-blowing position 302 is within the effective range 1703 (YES in S1032), the generation unit 105 sets "valid" in the flag (S1041).

Meanwhile, if the horizontal air-blowing position 302 is outside the effective range 1703 (NO in S1032), the generation unit 105 sets "invalid" in the flag (S1042).

If "invalid" is set in the flag, the display unit 102 displays the invalid mark 950 in the vicinity of the association icon 231X.

In this manner, with the communication device 100 according to the fourth embodiment, when the horizontal air-blowing position 302 inputted by the user is outside the effective range 1702 or 1703 corresponding to the height-instruction icon 230 selected by the user, the user is notified that the input is invalid. Therefore, even when the actual air-blowing position of the air conditioner 600 differs from the air-blowing position inputted by the user, the user can have a sense of acceptance.

Although an example in which the invalid mark 950 is displayed has been described in the fourth embodiment, a valid mark indicating that the user input is valid may be displayed in the display unit 102 when valid is set in the flag. Through this configuration, the user can be notified that the input is valid.

First Modification

FIG. 19 illustrates an operation screen 201 according to a first modification of the present disclosure. In the first modification, when the air conditioner 600 cannot blow the air to the air-blowing position inputted by the user, the user is notified to that effect.

In the example illustrated in FIG. 19, the user has associated the horizontal air-blowing position 302 with the vertical air-blowing position 304 defined by the second height-instruction icon 232. The air conditioner 600 may not be able to blow the air at the height indicated by the vertical air-blowing position 304 defined by the second height-instruction icon 232 at the horizontal air-blowing position 302 illustrated in FIG. 19.

In this case, the air conditioner 600 attempts to blow the air to an air-blowing position that is as close as possible to the air-blowing position inputted by the user. In the example illustrated in FIG. 19, a position 1901 may be closest to the horizontal air-blowing position 302 on the plan view 210 while the vertical air-blowing position 304 inputted by the user is retained. In this case, the generation unit 105 displays, at the position 1901, an air-blowing position mark 1901X that indicates the actual air-blowing position of the air conditioner 600.

Through this configuration, the user can recognize the reason why the air is not blown to the air-blowing position inputted by the user, and can also recognize the actual air-blowing position of the air conditioner 600.

In this case, the air conditioner 600 sets a plane perpendicular to the floor along the direction of the horizontal airflow-direction component 212 included in the control data, and sets, along the stated plane, a fan-shaped region defined by the vertical airflow-direction component. If the fan-shaped region does not overlap the region in which the air conditioner 600 can blow the air, the air conditioner 600 determines that the air cannot be blown to the air-blowing position inputted by the user.

The air conditioner 600 then obtains a position that is closest to the fan-shaped region within the region in which the air conditioner 600 can blow the air. The air conditioner 600 then transmits, to the communication device 100, feedback information indicating that the obtained closest position is the actual air-blowing position.

The communication device 100 may display the air-blowing position mark 1901X at the position 1901 on the plan view 210 indicating the actual air-blowing position defined by the feedback information. Although the air conditioner 600 has determined whether the air conditioner 600 can blow the air to the air-blowing position inputted by the user, this implementation is merely an example, and the server 900 or the communication device 100 may make such a determination, Second Modification FIG. 20 illustrates an operation screen 201 according to a second modification of the present disclosure. In the second modification, the airflow direction of the air conditioner 600 is changed so as to follow the user's movement.

The air conditioner 600 includes a position sensor that detects the position of the user. The air conditioner 600 periodically transmits the detected position of the user to the communication device 100. Upon receiving the position of the user from the air conditioner 600, the communication device 100 causes the generation unit 105 to determine whether the received position is different from the previously received position by a prescribed value or r yore. If the detected position of the user is different from the previously detected position of the user by the prescribed value or more, the generation unit 105 determines that the user has moved.

In the example illustrated in FIG. 20, the user first specifies the horizontal air-blowing position 302 by using the plan view 210, and the air conditioner 600 blows the air in the direction of the horizontal airflow-direction component 212. Then, the user moves to a position 302', and the communication device 100 detects the user's movement. Therefore, the communication device 100 generates control data in which the position 302' corresponds to the horizontal air-blowing position, and transmits the generated control data to the air conditioner 600. Through this operation, the air conditioner 600 changes the airflow direction from the direction of the horizontal airflow-direction component 212 to the direction of a horizontal airflow-direction component 212'. Thus, the air conditioner 600 can blow the air toward the user even when the user moves, Although the communication device 100 has detected the movement of the user in this example, the server 900 may detect the movement of the user. In this case, the server 900 may detect the movement of the user by communicating with the air conditioner 600, and if the server 900 detects the movement of the user, the server 900 may notify the communication device 100 of the position to which the user has moved. The communication device 100 may then generate control data in which the position to which the user has moved corresponds to the horizontal air-blowing position, and transmit the generated control data to the air conditioner 600.

Third Modification

Figure 21:
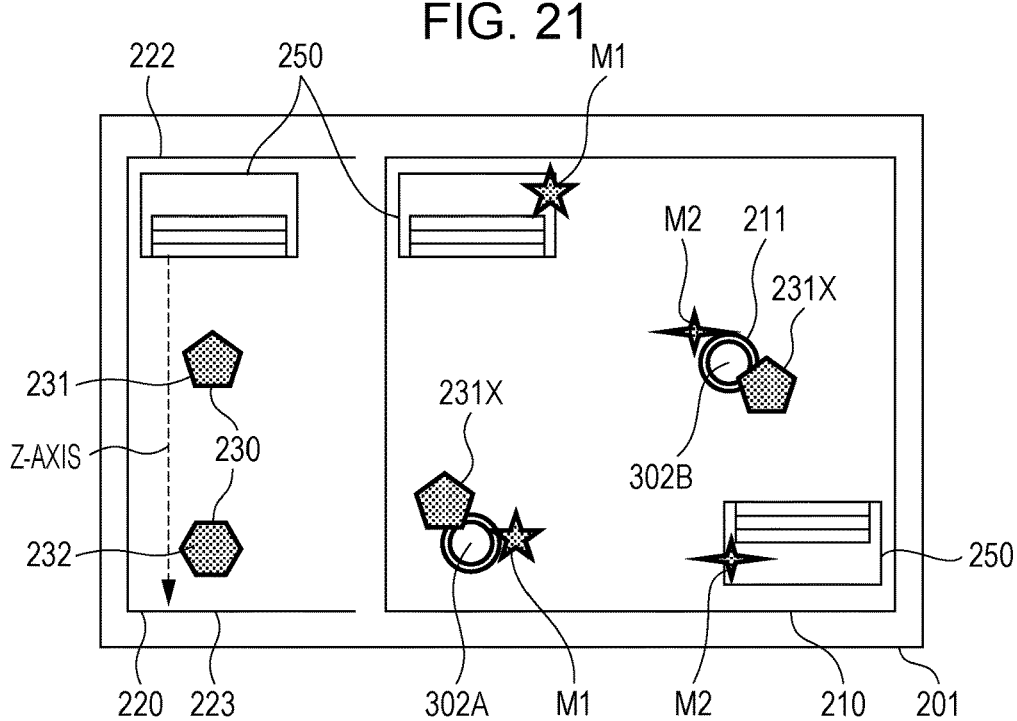
FIG. 21 illustrates an operation screen according to a third modification of the present disclosure.

FIG. 21 illustrates an operation screen 201 according to a third modification of the present disclosure. In the third modification, the user can select, among multiple air conditioners 600 installed in a room, an air conditioner 600 that the user wants to blow the air.

In the example illustrated in FIG. 21, air-conditioner icons 250 are displayed at the upper left corner and the lower right corner of the plan view 210, and two air conditioners 600 are installed in the room.

The air-conditioner icon 250 at the upper left is provided with a star-shaped identification mark M1, and the air-conditioner icon 250 at the lower right is provided with a cross-shaped identification mark M2.

For example, the user A inputs a horizontal air-blowing position 302A as the horizontal air-blowing position 302 and inputs the vertical air-blowing position 304 defined by the first height-instruction icon 231 as the vertical air-blowing position 304. In addition, the user A selects the air-conditioner icon 250 located at the upper left as the air conditioner 600 that the user A wants to blow the air. Thus, the in-plane instruction icon 211 is displayed at the horizontal air-blowing position 302A, and the association icon 231X corresponding to the first height-instruction icon 231 and the identification mark M1 are displayed in the vicinity of the in-plane instruction icon 211. In this case, the user A may select the air-conditioner icon 250 by tapping one of the multiple air-conditioner icons 250 displayed on the plan view 210 that the user A wants to blow the air.

Similarly to the operation of the user A, the user B inputs a horizontal air-blowing position 302B as the horizontal air-blowing position 302 and inputs the vertical air-blowing position 304 defined by the first height-instruction icon 231 as the vertical air-blowing position 304. In addition, the user B taps the air-conditioner icon 250 located at the lower right. This, the in-plane instruction icon 211 is displayed at the horizontal air-blowing position 302B and the association icon 231X and the identification mark M2 are displayed in the vicinity of the in-plane instruction icon 211.

The communication device 100 then transmits the control data that is based on the air-blowing position inputted by the user A to the air conditioner 600 that corresponds to the air-conditioner icon 250 located at the upper left, and transmits the control data that is based on the air-blowing position Inputted by the user B to the air conditioner 600 that corresponds to the air-conditioner icon 250 located at the lower right.

Through this operation, even in a case in which multiple air conditioners 600 are installed in a room, the user can select an air conditioner 600 that the user wants to blow the air, and can immediately identify the air conditioner 600 that the user has selected by the identification mark M1 or M2.

Fourth Modification

Figure 22:
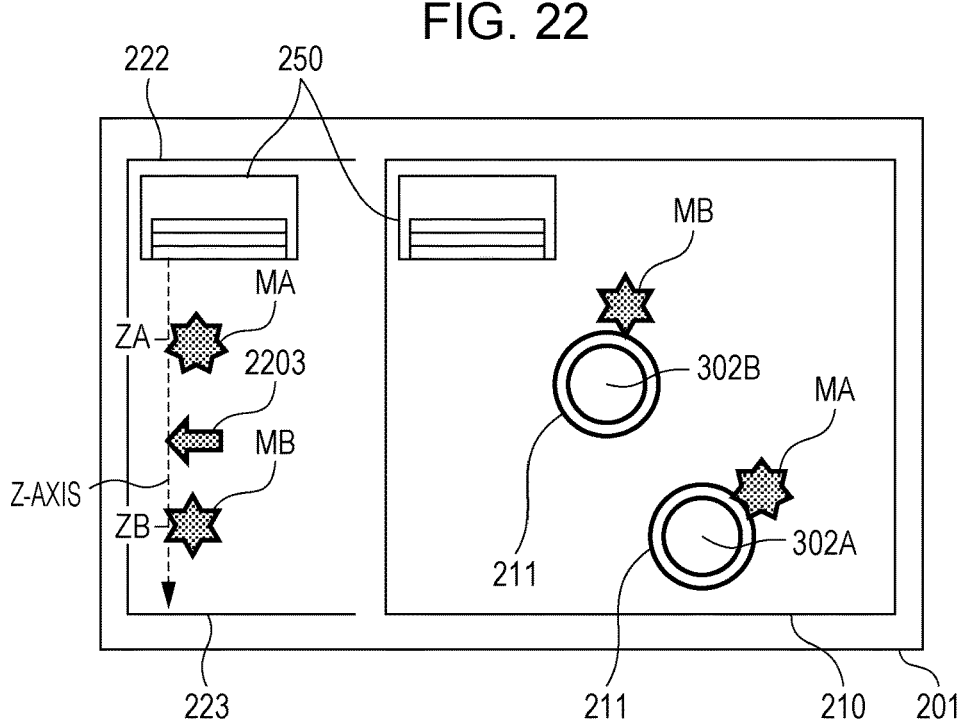
FIG. 22 illustrates an operation screen according to a fourth modification of the present disclosure.

FIG. 22 illustrates an operation screen 201 according to a fourth modification of the present disclosure. In the first through fourth embodiments, the user inputs the vertical air-blowing position 304 by selecting either the first height-instruction icon 231 or the second height-instruction icon 232. In the fourth modification, the user inputs the vertical air-blowing position 304 by specifying any desired position on the profile view 220.

The profile view 220 displays a height-instruction icon 2203 that allows the user to input the vertical air-blowing position 304. The user swipes to move the height-instruction icon 2203 vertically along the Z-axis and stops the height-instruction icon 2203 at a desired position.

In the example illustrated in FIG. 22, the user A positions the height-instruction icon 2203 at a coordinate ZA, and a height specification mark MA for clearly indicating the vertical air-blowing position 304 specified by the user A is displayed in the vicinity of the coordinate ZA. In a similar manner, the user B positions the height-instruction icon 2203 at a coordinate ZB, and a height specification mark MB for clearly indicating the vertical air-blowing position 304 specified by the user B is displayed in the vicinity of the coordinate ZB.

Then, the user A inputs the horizontal air-blowing position 302A as the horizontal air-blowing position 302 on the plan view 210, and associates the horizontal air-blowing position 302A with the vertical air-blowing position 304 indicated by the coordinate ZA. Thus, the in-plane instruction icon 211 is displayed at the horizontal air-blowing position 302A, and the height specification mark MA is displayed in the vicinity of the in-plane instruction icon 211.

The user B inputs the horizontal air-blowing position 302B as the horizontal blowing position 302 on the plan view 210, and associates the horizontal air-blowing position 302B with the vertical air-blowing position 304 indicated by the coordinate ZB. Thus, the in-plane instruction icon 211 is displayed at the horizontal air-blowing position 302B, and the height specification mark MB is displayed in the vicinity of the in-plane instruction icon 211.

The user A first swipes to move the height-instruction icon 2203 so as to specify the vertical air-blowing position 304. Thus, the height specification mark MA is displayed at the coordinate ZA. The user A then taps the plan view 210 on the horizontal air-blowing position 302A. Thus, the in-plane instruction icon 211 is displayed. The user A then swipes to move the height specification mark MA onto the in-plane instruction icon 211 displayed at the horizontal air-blowing position 302A. Through this operation, the vertical air-blowing position 304 indicated by the coordinate ZA is associated with the horizontal air-blowing position 302 indicated by the horizontal air-blowing position 302A.

In a similar manner, the user B swipes to move the height specification mark MB onto the in-plane instruction icon 211 displayed at the horizontal air-blowing position 302B. Through this operation, the vertical air-blowing position 304 indicated by the coordinate ZB is associated with the horizontal air-blowing position 302 indicated by the horizontal air-blowing position 302B.

The generation unit 105 then generates control data from the vertical air-blowing positions 304 and the horizontal air-blowing positions 302 inputted by the users A and B, as in the second embodiment.

In this manner, in the fourth modification, the user can set the vertical air-blowing position 304 at a desired position by using the height-instruction icon 2203.

In the fourth modification, the user inputs the vertical air-blowing position 304 by swiping to move the height-instruction icon 2203. However, this implementation is merely an example, and, for example, the coordinate of a position along the Z-axis on the profile view 220 on which the user has tapped may be set as the vertical air-blowing position 304 inputted by the user.

Fifth Modification

In the foregoing descriptions, an example in which the air-blowing position of the air conditioner 600 is inputted has been illustrated, but the present disclosure is not limited to such an example. For example, the user may input, in addition to the air-blowing position of the air conditioner 600, other parameters for the air conditioner 600. Examples of the parameters include an airflow volume. For example, in FIG. 8, when the user A keeps the in-plane instruction icon 211A pressed down, the display unit 102 displays an adjustment screen for adjusting the airflow volume so as to overlap the operation screen 201. Then, the generation unit 105 may associate the airflow volume inputted by the user with the air-blowing position inputted by the user A and generate control data accordingly.

Sixth Modification

Although the plan view 210 and the profile view 220 are displayed simultaneously in the operation screen 201 in the forgoing descriptions, only one of the plan view 210 and the profile view 220 may be displayed. In this case, the plan view 210 may be displayed first, and the profile view 220 may be displayed after the horizontal air-blowing position 302 has been inputted. Alternatively, the profile view 220 may be displayed first, and the plan view 210 may be displayed after the vertical air-blowing position 304 has been inputted.

The present disclosure is beneficial in a technical field of controlling an air-blowing apparatus by using a communication device, such as a smartphone and a tablet terminal.

What is claimed is:

1. A control method through which a communication device provided with a display controls an air-blowing apparatus, the communication device including a memory that stores installation position information indicating a horizontal position of the air-blowing apparatus in a room in which the air-blowing apparatus is installed and a vertical position of the air-blowing apparatus with respect to a floor of the room, the control method comprising:

displaying an operation screen on the display, the operation screen simultaneously displaying a plan view of the room in which a user can input a horizontal air-blowing position, indicating a horizontal position to which air is blown from the air-blowing apparatus, and a profile view of the room in which the user can input a vertical air-blowing position, indicating a vertical position to which air is blown from the air-blowing apparatus;

detecting the horizontal air-blowing position and the vertical air-blowing position, based on an input of the horizontal air-blowing position by the user through the plan view of the room in the operation screen displayed on the display, and an input of the vertical air-blowing position by the user through the profile view of the room in the operation screen displayed on the display;

determining an airflow direction of the air-blowing apparatus based on the detected horizontal air-blowing position, the detected vertical air-blowing position, and the stored installation position information;

generating a control command that specifies the determined airflow direction based on both the detected horizontal air-blowing position and the detected vertical air-blowing position; and transmitting the generated control command to the air-blowing apparatus to control movement of a component of the air-blowing apparatus to change the vertical and horizontal air-blowing positions based on the control command, wherein an in-plane instruction icon that indicates the detected horizontal air-blowing position is displayed in the plan view, and a height-instruction icon that indicates the detected vertical air-blowing position is displayed in the profile view, and in the generating, when the height-instruction icon displayed in the profile view is dragged into the plan view, and is dropped within a predetermined range with respect to the detected horizontal air-blowing position, the detected horizontal air-blowing position is associated with the detected vertical air-blowing position to determine a three-dimensional position to which air is blown from the air-blowing apparatus, and the control command is generated based on the detected horizontal air-blowing position and the detected vertical air-blowing position associated with each other.

2. The control method according to claim 1,
wherein one or more users input respective horizontal air-blowing positions and respective vertical air-blowing positions,
wherein the control method further includes storing the horizontal air-blowing positions and the vertical air-blowing positions inputted by the one or more users in the memory such that the horizontal air-blowing positions are associated with the corresponding vertical air-blowing positions for the respective users, and
wherein, in the generating, the control commands are generated from the horizontal air-blowing positions and the vertical air-blowing positions for the respective users stored in the memory.

3. The control method according to claim 1, further comprising:
determining whether the air-blowing apparatus can blow the air to the horizontal air-blowing position and the vertical air-blowing position inputted by the user, and
displaying an actual horizontal air-blowing position of the air-blowing apparatus in the plan view when it is determined that the air-blowing apparatus cannot blow the air to the horizontal air-blowing position and the vertical air-blowing position inputted by the user.

4. The control method according to claim 1, further comprising:
detecting a movement of the user,
wherein, in the generating, when the movement of the user is detected after the air-blowing apparatus has been controlled in accordance with the control command, a control command to change the determined airflow direction to a position to which the user has moved is generated.

5. The control method according to claim 1,
wherein the communication device controls plural air-blowing apparatuses including the air-blowing apparatus,
wherein, in the detecting, a selection of one of the air-blowing apparatuses by a user is detected, and
wherein, in the generating, the control command is transmitted to the one of the air-blowing apparatuses that is selected by the user.

6. The control method according to claim 1,
wherein a plurality of height-instruction icons that are associated with mutually different vertical air-blowing positions are displayed in the profile view, and
wherein, in the detecting, the vertical air-blowing position is detected by detecting a selection of one of the height-instruction icons by the user.

7. The control method according to claim 1,
wherein, in the detecting, the user specifies a position in the profile view, and a vertical air-blowing position corresponding to the position specified by the user is detected as a vertical air-blowing position inputted by the user.

8. The control method according to claim 1,
wherein, when a first input of the vertical air-blowing position is received in the profile view, an effective horizontal air-blowing range in the plan view corresponding to the first input of the vertical air-blowing position in the profile view is determined, and
when a second input of the vertical air-blowing position, which is different from the first input of the vertical air-blowing position, is received in the profile view, the effective horizontal air-blowing range in the plan view is changed to correspond to the second input of the vertical air-blowing position in the profile view.

9. The control method according to claim 8, wherein
the effective horizontal air-blowing range determined in response to the first input of the vertical air-blowing position is displayed in the plan view, and
the effective horizontal air-blowing range changed in response to the second input of the vertical air-blowing position is displayed in the plan view.

10. The control method according to claim 1, wherein
when a first input of the vertical air-blowing position is received in the profile view, a first effective horizontal air-blowing range in the plan view corresponding to the first input of the vertical air-blowing position in the profile view is displayed in the plan view, and
when a second input of the vertical air-blowing position, which is different from the first input of the vertical air-blowing position, is received in the profile view, the display of the plan view is changed to display a second effective horizontal air-blowing range corresponding to the second input of the vertical air-blowing position in the profile view.

11. The control method according to claim 10,
wherein, after the effective horizontal air-blowing range is displayed in response to the first input of the vertical air-blowing position received in the profile view, when an input of the horizontal air-blowing position is received in the plan view outside the displayed effective horizontal air-blowing range, an invalid mark indicating that the input of the horizontal air-blowing position is invalid is displayed.

12. The control method according to claim 1, wherein
when the height-instruction icon is dropped outside the predetermined range in the plan view, the detected horizontal air-blowing position is not associated with the detected vertical air-blowing position, and the control command is not generated.

13. The control method according to claim 1, wherein
the horizontal air-blowing position comprises X coordinate and Y coordinate in a floor plan of the room, and
the vertical air-blowing position comprises Z coordinate indicating a height from a floor of the room, and
the three-dimensional position is defined by the X and Y coordinate of the horizontal air-blowing position and the Z coordinate of the vertical air-blowing position.

14. A communication device that is provided with a display and that controls an air-blowing apparatus, the communication device comprising:
a memory that stores installation position information indicating a horizontal position of the air-blowing apparatus in a room in which the air-blowing apparatus is installed and a vertical position of the air-blowing apparatus with respect to a floor of the room;
a display that displays an operation screen simultaneously displaying a plan view of the room in which a user can input a horizontal air-blowing position, indicating a horizontal position to which air is blown from the air-blowing apparatus, and a profile view of the room in which the user can input a vertical air-blowing position, indicating a vertical position to which air is blown from the air-blowing apparatus;

a detector that detects the horizontal air-blowing position and the vertical air-blowing position, based on an input of the horizontal air-blowing position by the user through the plan view of the room in the operation screen displayed on the display, and an input of the vertical air-blowing position by the user through the profile view of the room in the operation screen displayed on the display;

a controller that determines an airflow direction of the air-blowing apparatus based on the detected horizontal air-blowing position, the detected vertical air-blowing position, and the stored installation position information, and generates a control command that specifies the determined airflow direction based on both the detected horizontal air-blowing position and the detected vertical air-blowing position; and a transmitter that transmits the generated control command to the air-blowing apparatus to control movement of a component of the air-blowing apparatus to change the vertical and horizontal air-blowing positions based on the control command, wherein the display displays, in the plan view, an in-plane instruction icon that indicates the detected horizontal air-blowing position, and, in the profile view, a height-instruction icon that indicates the detected vertical air-blowing position, and when the height-instruction icon displayed in the profile view is dragged into the plan view, and is dropped within a predetermined range with respect to the detected horizontal air-blowing position, the controller associates the detected horizontal air-blowing position with the detected vertical air-blowing position to determine a three-dimensional position to which air is blown from the air-blowing apparatus, and generates the control command based on the detected horizontal air-blowing position and the detected vertical air-blowing position associated with each other.

15. The control method according to claim 14, wherein when a first input of the vertical air-blowing position is received in the profile view, an effective horizontal air-blowing range in the plan view corresponding to the first input of the vertical air-blowing position in the profile view is displayed in the plan view, and when a second input of the vertical air-blowing position, which is different from the first input of the vertical air-blowing position, is received in the profile view, the display of the plan view is changed to display the effective horizontal air-blowing range corresponding to the second input of the vertical air-blowing position in the profile view.

16. The communication device according to claim 14, wherein when the height-instruction icon is dropped outside the predetermined range in the plan view, the controller does not associate the detected horizontal air-blowing position with the detected vertical air-blowing position, and does not generate the control command.

* * * * *